(12) United States Patent
Duvenhage et al.

(10) Patent No.: US 9,669,390 B2
(45) Date of Patent: Jun. 6, 2017

(54) CATALYST FOR LOW TEMPERATURE SLURRY BED FISCHER-TROPSCH SYNTHESIS

(71) Applicant: RES USA, LLC, Westminister, CO (US)

(72) Inventors: Dawid J. Duvenhage, Evergreen, CO (US); Christine Schmidt, Denver, CO (US); Mark Still, Frederick, CO (US); Khalid Azzam, Houston, TX (US); Karl C. Kharas, South Bound Brook, NJ (US); Sara Hunegnaw, Denver, CO (US); Olga Ionkina, Boulder, CO (US); Ray J. Huang, Plain City, OH (US); Harold A. Wright, Longmont, CO (US)

(73) Assignee: RES USA, LLC, Westminister, CO (US)

( * ) Notice: Subject to any disclaimer, the term of this patent is extended or adjusted under 35 U.S.C. 154(b) by 0 days.

(21) Appl. No.: 14/767,240

(22) PCT Filed: Feb. 11, 2014

(86) PCT No.: PCT/US2014/015711
§ 371 (c)(1),
(2) Date: Aug. 11, 2015

(87) PCT Pub. No.: WO2014/126887
PCT Pub. Date: Aug. 21, 2014

(65) Prior Publication Data
US 2016/0001267 A1    Jan. 7, 2016

Related U.S. Application Data
(60) Provisional application No. 61/764,153, filed on Feb. 13, 2013.

(51) Int. Cl.
*B01J 23/78* (2006.01)
*B01J 37/03* (2006.01)
(Continued)

(52) U.S. Cl.
CPC ............ *B01J 23/78* (2013.01); *B01J 21/066* (2013.01); *B01J 21/08* (2013.01); *B01J 21/10* (2013.01);
(Continued)

(58) Field of Classification Search
CPC ........ B01J 23/745; B01J 23/78; B01J 23/862; B01J 37/0236; B01J 37/031; B01J 37/04; B01J 37/06; B01J 37/08; C10G 2/32
See application file for complete search history.

(56) References Cited

U.S. PATENT DOCUMENTS

| | | | |
|---|---|---|---|
| 5,504,118 A | 4/1996 | Benham et al. | |
| 8,791,041 B2 * | 7/2014 | Duvenhage | B01J 23/002 502/201 |

(Continued)

FOREIGN PATENT DOCUMENTS

| | | |
|---|---|---|
| DE | 763864 | 3/1953 |
| WO | 2009032701 | 3/2009 |
| WO | 2010141379 | 12/2010 |

OTHER PUBLICATIONS

Extended European Search Report dated Sep. 28, 2016 for European Application No. 14751928.4, (13 pgs.).

(Continued)

*Primary Examiner* — Jun Li
(74) *Attorney, Agent, or Firm* — Timothy S. Westby; Porter Hedges LLP

(57) ABSTRACT

A method for controllably producing a hematite-containing Fischer-Tropsch catalyst by combining an iron nitrate solution with a precipitating agent solution at a precipitating (Continued)

temperature and over a precipitation time to form a precipitate comprising iron phases; holding the precipitate from at a hold temperature for a hold time to provide a hematite containing precipitate; and washing the hematite containing precipitate via contact with a wash solution and filtering, to provide a washed hematite containing catalyst. The method may further comprise promoting the washed hematite containing catalyst with a chemical promoter; spray drying the promoted hematite containing catalyst; and calcining the spray dried hematite containing catalyst to provide a calcined hematite-containing Fischer-Tropsch catalyst.

45 Claims, 7 Drawing Sheets

(51) Int. Cl.
| | |
|---|---|
| B01J 23/889 | (2006.01) |
| B01J 21/06 | (2006.01) |
| B01J 21/08 | (2006.01) |
| B01J 21/10 | (2006.01) |
| B01J 23/745 | (2006.01) |
| B01J 35/00 | (2006.01) |
| B01J 35/10 | (2006.01) |
| C10G 2/00 | (2006.01) |
| B01J 23/86 | (2006.01) |
| B01J 35/02 | (2006.01) |
| B01J 37/02 | (2006.01) |
| B01J 37/04 | (2006.01) |
| B01J 37/06 | (2006.01) |
| B01J 37/08 | (2006.01) |

(52) U.S. Cl.
CPC ........... *B01J 23/745* (2013.01); *B01J 23/862* (2013.01); *B01J 23/8892* (2013.01); *B01J 35/006* (2013.01); *B01J 35/0026* (2013.01); *B01J 35/023* (2013.01); *B01J 35/1014* (2013.01); *B01J 35/1019* (2013.01); *B01J 35/1038* (2013.01); *B01J 35/1042* (2013.01); *B01J 35/1061* (2013.01); *B01J 35/1066* (2013.01); *B01J 37/0236* (2013.01); *B01J 37/03* (2013.01); *B01J 37/031* (2013.01); *B01J 37/04* (2013.01); *B01J 37/06* (2013.01); *B01J 37/08* (2013.01); *C10G 2/332* (2013.01); *B01J 35/0046* (2013.01)

(56) References Cited

U.S. PATENT DOCUMENTS

| | | | |
|---|---|---|---|
| 8,946,114 B2 | 2/2015 | Nikrad et al. | |
| 9,018,128 B2* | 4/2015 | Duvenhage | B01J 21/08 |
| | | | 502/245 |
| 2009/0069451 A1 | 3/2009 | Demirel et al. | |
| 2009/0075814 A1 | 3/2009 | Duvenhage et al. | |
| 2009/0298681 A1* | 12/2009 | Nikrad | B01J 23/002 |
| | | | 502/243 |
| 2010/0311570 A1* | 12/2010 | Duvenhage | B01J 23/002 |
| | | | 502/74 |

OTHER PUBLICATIONS

E.S. Lox, Characterization of a Promoted Precipitated Iron Catalyst for Fischer-Tropsch Synthesis, 1988, 22 pgs., Elsevier Science Publishers B.V., Amsterdam, The Netherlands.

International Preliminary Report on Patentability issued Aug. 27, 2015 in corresponding WO Application No. PCT/US2014/015711, (12 pgs).

* cited by examiner

CATALYST FOR LOW TEMPERATURE SLURRY BED FISCHER-TROPSCH SYNTHESIS

BACKGROUND

Technical Field

The present invention generally relates to processes for hydrogenating carbon monoxide, and more particularly relates to iron-based compositions for catalyzing such processes, and still more particularly relates to the manufacture of hematite containing Fischer-Tropsch catalysts.

Description of Related Art

The Fischer-Tropsch process is a well known catalyzed reaction in which carbon monoxide and hydrogen are converted into various forms of hydrocarbons. Catalysts for the reaction are commonly based on iron, sometimes using a precipitated iron-based catalyst that also contains some type of promoter to improve catalyst stability or to affect the properties of the hydrocarbons produced.

U.S. Pat. No. 5,504,118 describes Fischer-Tropsch reaction schemes using certain iron catalysts promoted with potassium and copper in a slurry reactor to produce hydrocarbon products having more than five carbon atoms, water, and alcohols.

German Patent No. 763864 describes certain methods of making iron catalysts for production of hydrocarbons from carbon monoxide and hydrogen under normal or increased pressure (5-50 atm). The catalysts contain bi- and trivalent iron salts and up to 0.5% copper, and are made by heating and precipitating the solutions.

Methods of making iron catalyst for production of hydrocarbons are also described in Storch H. H., Anderson R. B., Fischer L. J., Hawk C. O., Anderson H. C., and Golumbic N., Synthetic Liquid Hydrocarbon from Hydrogenation of Carbon Monoxide—Part 1: Review of Literature: Bureau of Mines Research on Effect of Catalyst Preparation, Reduction, and Induction Procedures on Activity; Correlation of Physical Properties of the Catalysts with Their Activity, Washington, 1948.

There is continuing interest in the development of iron-based catalysts for catalyzing the hydrogenation of carbon monoxide to form hydrocarbons.

SUMMARY

Herein disclosed is a method for controllably producing a hematite-containing Fischer-Tropsch catalyst, the method comprising: (a) combining an iron nitrate solution with a precipitating agent solution at a precipitating temperature and over a precipitation time to form a precipitate comprising iron phases, wherein the precipitating temperature is less than or equal to about 95° C.; wherein the iron nitrate, the precipitating agent solution, or both, comprise a refractory material; (b) holding the precipitate from (a) at a hold temperature for a hold time to provide a hematite containing precipitate; and (c) washing the hematite containing precipitate from (b) via contact with a wash solution and filtering, to provide a washed hematite containing Fischer-Tropsch catalyst. The method may further comprise adding a hematite promoter to control the amount of hematite in the hematite-containing Fischer-Tropsch catalyst. The hematite-containing Fischer-Tropsch catalyst may comprise from about 0.5 to about 80 weight percent hematite. The hematite promoter may be selected from the group consisting of basic silica, acidic silica, alumina, titania, manganese, colloidal silica, colloidal alumina, and combinations thereof. In embodiments wherein the hematite-containing Fischer-Tropsch catalyst comprises silica, 1, 10, 20, 30, 40, 50, 60, 70, 80, 90, or 100% of the silica in the hematite-containing Fischer-Tropsch catalyst may be co-precipitated during (a). The hematite promoter may comprise one or more component selected from the group consisting of colloidal acidic silica, basic silica, and potassium water glass. In embodiments, the hematite promoter comprises one or more component selected from the group consisting of alumina, titania, manganese, and colloidal alumina.

The precipitation time may be less than or equal to about 15 minutes. The hold time may be greater than or equal to about 5, 10, 30, 60, 75, or 90 minutes. The hold temperature may be greater than or equal to about 85° C., or 95° C. In embodiments, the iron nitrate solution further comprises copper nitrate, and the precipitate further comprises copper phases co-precipitated with the iron phases. The precipitating agent may comprise a compound selected from the group consisting of $NH_4OH$, $Na_2CO_3$, $NaOH$, $K_2CO_3$, $KOH$, $(NH_4)_2CO_3$, $(NH_4)HCO_3$, $NaHCO_3$ and $KHCO_3$.

The method may further comprise: (d) promoting the washed hematite containing catalyst from (c) with a chemical promoter; (e) spray drying the promoted hematite containing catalyst from (d); and (f) calcining the spray dried hematite containing catalyst from (e) to provide a calcined hematite-containing Fischer-Tropsch catalyst. In embodiments, the washed precipitate comprises less than about 0.3, 0.2, or 0.15 weight percent sodium. In embodiments, the washed catalyst comprises a solids content of greater than about 15, 21, or 25 weight percent. In embodiments, the washed catalyst comprises a solids content in the range of from about 25 weight percent to about 35 weight percent.

The method may further comprise manipulating the hold time, the hold temperature, or both such that the calcined catalyst comprises from about 10 weight percent to about 70 weight percent hematite. The calcined catalyst may comprise more than about 25 weight percent hematite.

In embodiments, the method further comprises selecting the hold time, the hold temperature, or both such that the calcined catalyst exhibits an average hematite crystallite size in the range of from about 1 nm to about 75 nm. The calcined catalyst may exhibit an average hematite crystallite size of greater than or equal to about 15, 25, or 35 nm. In embodiments, the method further comprises selecting the hold time, the hold temperature, or both such that the calcined catalyst exhibits an average crystallite size in the range of from about 1 nm to about 50 nm.

In embodiments, the method further comprises selecting the hold time, the hold temperature, or both such that the calcined catalyst exhibits a reduction temperature of less than or equal to about 245° C., in the range of from about 200° C. and about 245° C., or both.

In embodiments, the iron nitrate solution further comprises copper nitrate, the precipitate further comprises copper phases co-precipitated with the iron phases, and the calcined catalyst comprises, per 100 Fe, from about 1 to about 10 parts by weight, or from about 1 to about 5 parts by weight copper.

The calcined catalyst may comprise from about 1 to about 10 parts by weight, or from about 1 to about 7 parts by weight chemical promoter. In embodiments, the chemical promoter comprises potassium. In embodiments, the chemical promoter is selected from the group consisting of $K_2CO_3$, $KHCO_3$, and $KOH$. In embodiments, the calcined catalyst comprises, per 100 Fe, from about 1 weight percent to about 10 parts by weight $K_2O$.

The method may further comprise incorporating a silica support into the catalyst. In embodiments, the calcined catalyst comprises, per 100 Fe, from about 0 to about 35 parts by weight, from about 0 to about 25 parts by weight, or from about 0 to about 15 parts by weight silica. In embodiments, the silica comprises a colloidal silica having a pH in the range of from about 8 to about 11, a weight percent silica in the range of from about 30 to about 40, and a surface area in the range of from about 250 $m^2/g$ to about 350 $m^2/g$. The colloidal silica may have a density of about 1.2 $g/cm^3$, a viscosity of about 7 cP, a $Na_2O$ content less than about 0.6 weight percent, or a combination thereof.

The method may further comprise activating the calcined catalyst by exposure to a gas comprising carbon monoxide, hydrogen, or a combination thereof for a selected period of time at selected levels of pressure, temperature, and space velocity sufficient to enhance catalytic activity for hydrogenating carbon monoxide to form higher hydrocarbons.

In embodiments, calcining comprises calcining according to the following program: ramping the temperature at a rate in the range of from about 0.1° C./min to about 80° C./min to a maximum temperature in the range of 300° C. to 550° C., and holding at the maximum temperature for at least 4 hours. In embodiments, the calcining comprises a two-step calcination program wherein the catalyst is heated to a selected maximum temperature twice, with gradual cooling of the catalyst between the calcinations.

In embodiments, the iron nitrate solution comprises at least one solution selected from the group consisting of commercially available ferric nitrate solutions, iron nitrate solutions formed via dissolution of iron powder, and iron nitrate solutions produced via dissolution of scrap metal iron.

A catalyst produced via the herein disclosed method is also disclosed.

Also disclosed herein is a hematite-containing Fischer-Tropsch catalyst, comprising iron, copper and potassium in a weight ratio of 100 Fe:1-10 Cu:1-10 $K_2O$:0-35 $SiO_2$, wherein the iron in the catalyst comprises from about 1% weight percent to about 70 weight percent hematite. The average hematite crystallite size of the catalyst may be in the range of from about 1 to about 70 nm. In embodiments, the mean hematite crystallite size is in the range of from about 1 to about 50 nm, or from about 1 to about 35 nm. The hematite-containing Fischer-Tropsch catalyst may have a TPR of less than or equal to about 245° C., less than or equal to about 240° C., less than or equal to about 235° C., less than or equal to about 230° C., less than or equal to about 225° C., less than or equal to about 220° C., less than or equal to about 215° C., less than or equal to about 210° C., less than or equal to about 205° C., or less than or equal to about 200° C. The catalyst may comprise a particulate structure with a particle size distribution in the range of from about 10 μm to about 100 μm. In embodiments, the catalyst comprises an uncalcined BET surface area in the range of from about 50 $m^2/g$ to about 450 $m^2/g$. In embodiments, the catalyst comprises an uncalcined mean pore diameter in the range of from about 25 Å to about 120 Å. In embodiments, the catalyst comprises an uncalcined mean pore volume in the range of from about 0.1 cc/g to about 0.8 cc/g. The catalyst may exhibit an improvement in physical attrition index with increasing hematite content from about 1 weight percent to about 70 weight percent.

Also disclosed herein is a method of producing Fischer-Tropsch hydrocarbon product, the process comprising: providing the herein disclosed catalyst; activating the catalyst by exposure to a gas comprising carbon monoxide and hydrogen for a selected period of time at selected levels of pressure, temperature, and space velocity, to produce an activated catalyst; and contacting a synthesis gas stream with the activated catalyst in a Fischer-Tropsch slurry-bed reactor whereby a Fischer-Tropsch hydrocarbon product is obtained. Activating the catalyst may further comprise: contacting the catalyst with synthesis gas, wherein the synthesis gas has a molar ratio of hydrogen to carbon monoxide in the range of from about 0.5 to about 2.5 or from about 0.7 to about 2.0, wherein the synthesis gas is introduced at a space velocity in the range of from about 1 to about 10 $NL(H_2+CO)/h/g$ Fe or from about 3.0 to about 7.0 $NL(H_2+CO)/h/g$ Fe, wherein the contacting is performed for an activation time in the range of from about 1 hour to about 30 hours, from about 4 hours to about 20 hours, or from about 4 hours to about 15 hours, wherein the activation temperature is a temperature in the range of from about 200° C. to about 350° C., from about 220° C. to about 300° C., or from about 240° C. to about 280° C., wherein the activation is performed at an activation pressure in the range of from about 5 bar to about 30 bar, from about 5 bar to about 20 bar, or from about 5 bar to about 15 bar, or a combination thereof. Contacting the synthesis gas stream with the activated catalyst in the Fischer-Tropsch slurry-bed reactor whereby the Fischer-Tropsch hydrocarbon product is obtained may be carried out at a temperature in the range of from about 200° C. to about 270° C., a pressure in the range of from about 5 bar to about 50 bar, a ratio of hydrogen to carbon monoxide in the synthesis gas in the range of from about 0.5 to about 2.5, a space velocity in the range of from about 1 to about 10 $NL(H_2+CO)/h/g$ Fe, or a combination thereof.

Also disclosed herein is a method of producing Fischer-Tropsch hydrocarbon product, the process comprising: providing the herein disclosed catalyst; activating the catalyst in two steps, a first step comprising exposing the catalyst to a first activation gas comprising hydrogen, and the second step comprising exposing the catalyst from the first activation step to a second activation gas comprising synthesis gas, wherein the time, pressure, temperature, and space velocity of activation gas in each step is controlled to produce the activated catalyst; and contacting a synthesis gas stream with the activated catalyst in a Fischer-Tropsch slurry-bed reactor whereby a Fischer-Tropsch hydrocarbon product is obtained. In embodiments, the first activation gas comprises from about 1 to about 100 mole percent hydrogen, the temperature of the first activation step is a temperature in the range of from about 100° C. to about 350° C., from about 100° C. to about 300° C., or from about 120° C. to about 260° C., the pressure of the first activation step is a pressure in the range of from about 1 bar to about 20 bar, from about 1 bar to 10 bar, or from about 1 bar to about 8 bar, the space velocity of the first activation gas is in the range of from about 1 to about 10 $NL(H_2)/h/g$ Fe or from about 1.0 to about 7.0 $NL(H_2)/h/g$ Fe, the first activation is performed for a first activation time in the range of from about 1 hour to about 30 hours, from about 1 hour to about 20 hours, or from about 1 hour to about 10 h, or a combination thereof. In embodiments, in the second activation step: the synthesis gas has a molar ratio of hydrogen to carbon monoxide in the range of from about 0.5 to about 2.5 or from about 0.7 to about 2.0, the synthesis gas is introduced at a space velocity in the range of from about 1 to about 10 $NL(H_2+CO)/h/g$ Fe or from about 3.0 to about 7.0 $NL(H_2+CO)/h/g$ Fe, the contacting is performed for an activation time in the range of from about 1 hour to about 30 hours, from about 4 hours to about 20 hours, or from about 4 hours to about 15 hours, the activation temperature is a temperature in the range of from about 200° C. to about 350° C., from about 220° C. to about 300° C., or from about 240° C. to about 280° C., the activation is performed at an activation pressure in the range of from about 5 bar to about 30 bar, from about 5 bar to about 20 bar, or from about 5 bar to about 15 bar, or a combination thereof.

These and other embodiments, features and advantages of the present invention will be apparent with reference to the following description and drawings.

BRIEF DESCRIPTION OF THE DRAWINGS

For a more detailed description of embodiments of the present invention, reference will now be made to the accompanying drawings, wherein.

NOTATION AND NOMENCLATURE

Figure 1B:
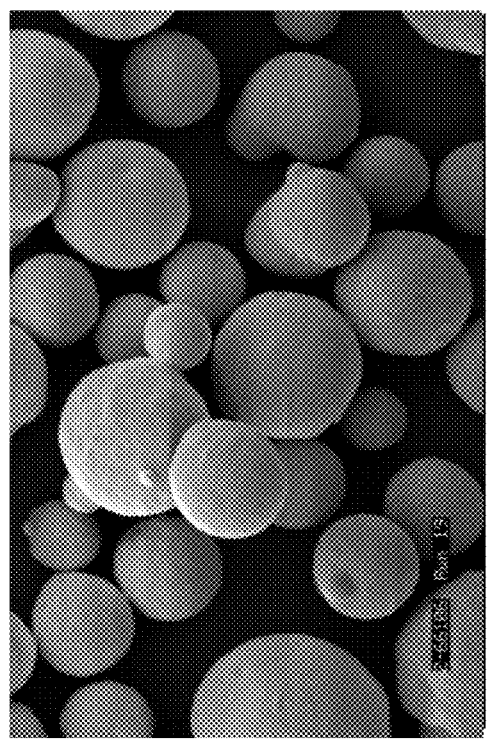
FIGS. 1a and 1b are scanning electron micrographs of a hematite-free catalyst and a hematite-containing catalyst of Example 1, respectively.

In the following discussion and in the claims, the terms "comprising," "including" and "containing" are used in an open-ended fashion, and thus should be interpreted to mean "including, but not limited to . . . ".

The singular forms "a," "an," and "the" include plural referents unless the context clearly dictates otherwise.

The term "about," when used in the context of a numerical value, means approximately or reasonably close to the given number, and generally includes, but is not limited to, ±10% of the stated number.

"Raw" catalyst refers to a formed, dry catalyst after calcination.

The term "activation" refers to the process whereby the raw catalyst is treated using an activation gas, e.g. a gas containing carbon monoxide, hydrogen, or a combination thereof, for a period of time under certain levels of pressure, temperature, and space velocity, such that the catalyst is active for catalyzing the hydrogenation of carbon monoxide to form hydrocarbon products.

The term "space velocity" is defined as the volumetric flow rate of synthesis gas (a mixture of hydrogen and carbon monoxide) measured in normal liters per hour divided by the weight (in grams) of iron in the catalyst contained in the reactor.

The term "normal" applies to gaseous material at a temperature of 0° C. and a pressure of 1 atmosphere.

DETAILED DESCRIPTION

Overview.

Herein disclosed are low temperature Fischer-Tropsch catalysts containing hematite, methods for the production of such catalysts, and methods of producing Fischer-Tropsch hydrocarbons with such catalysts. It has been unexpectedly discovered that specific amounts and sizes of hematite beneficially affect the reducibility, run time stability, selectivity, productivity, catalyst replacement rate, and attrition resistance of commercial Fischer-Tropsch catalysts. The presence of hematite may also provide other benefits including, but not limited to, improved (i.e. reduced) sodium content of the precipitate, thus facilitating removal thereof during catalyst washing, and/or providing a filter cake with a higher solids content, thus enabling spray drying of enhanced morphology spheres.

Conventionally, it is expected that low temperature precipitated iron catalysts predominantly form from 'hematite-free' ferri (oxy) hydroxide precipitates. This has recently again been demonstrated by Pretorius (Synthetic Liquids Production and Refining; de Klerk, A., et al.; ACS Symposium Series; American Chemical Society: Washington, D.C., 2011). Such precipitates generally yield very small (i.e. less than 10 nm) iron crystallites with very high surface area. However, it has been discovered that at least 35 percent of the surface area may be lost on calcination. The novel hematite-containing catalyst disclosed herein provides calcined surface area and pore structure similar to those of conventional hematite-free catalyst. Furthermore, it has been discovered that, when freshly prepared filter cake (i.e. 'precipitate') is allowed to transform in some degree to hematite, the surface characteristics of the resulting catalyst are similar to those of conventional hematite-free catalyst.

It has also been discovered that although the pore size and/or pore volume of the hematite-containing systems may initially decrease in the presence of low levels of hematite (e.g. about 1 to 10 weight percent hematite, the pore size and/or pore volume of hematite systems containing higher levels of hematite (e.g. about 40 to 50 weight percent hematite) approach or equal that of essentially hematite-free systems. The BET surface area of higher hematite systems may be similar to that of the BET surface area of hematite-free systems (e.g. slightly lower, such as, by way of non-limiting example, less than about 10 percent lower than the BET surface area of hematite-free systems).

As described in more detail hereinbelow, it has been unexpectedly discovered that hematite content and increasing crystallite size of freshly precipitated slurries can be beneficial to the Fischer-Tropsch process. Without wishing to be limited by theory, it is speculated that the formation of increasing quantities of hematite and the size thereof creates voids and volumes beneficial to Fischer-Tropsch catalysis, i.e. exposing Fischer-Tropsch active sites. It has been demonstrated (for example, Lox E. S. and Marin G. B., Applied Catalysis, 40 (1988) 197-218) that, due to coverage by silicon and potassium oxides, only 3 percent of the iron in a precipitated iron catalyst is typically exposed to the gas phase. It is speculated that the formation of hematite exposes more iron to benefit the reaction. The hematite content can be increased to up to 70 weight percent, while the hematite crystallite size can be increased to between 1 and 70 nm, depending on the slurry hold time.

It has also been discovered that the temperature of reduction of the herein disclosed hematite-containing catalyst is significantly lowered (e.g. 228° C.) relative to the reduction temperature of a hematite-free catalyst (e.g. about 246° C.), and may indeed be below the temperature at which the Fischer-Tropsch reaction utilizing the catalyst will ultimately be carried out (e.g. about 240° C.).

Under typical run conditions (for example, 200° C. to 270° C., 20 bar to 35 bar, and space velocity (SV) of 1.5 to 6.0 $Nl_{tot}/g_{cat}$), the herein disclosed Fischer-Tropsch catalyst may be resistant to sintering, with surface-average carbide sizes that increase at rates of less than about 0.10 nm/hr, 0.05 nm/hr, 0.023 nm/hr, or even lower, and/or with volume-averaged carbide sizes that increase at rates of less than about 0.10 nm/hr, 0.05 nm/hr, 0.033 nm/hr, or lower. The herein disclosed Fischer-Tropsch catalyst exhibits a particle size distribution conforming to log-normal distributions, the peak of which does not increase above 45, 40 nm, or 35 nm, during 1000, 1500, or 2000 hours of operation.

Elemental analysis of the herein-disclosed Fischer-Tropsch catalyst under typical run conditions indicates that, in embodiments, the catalyst composition is substantially stable for times on stream of at least 2000 hours, exhibiting little or substantially no change in promoter composition, and hence no leaching of promoters from the catalyst, during the run period.

Method of Making FT Catalyst.

Herein disclosed is a method of making a hematite-containing Fischer-Tropsch catalyst. In embodiments, the method comprises combining an iron nitrate solution with a precipitating agent solution at a precipitating temperature to form a precipitate comprising iron phases; aging the precipitate by holding the precipitation mixture at a hold temperature for a hold time in order to allow hematite transformation. In embodiments, the hold time is greater than or equal to about 5, 10, 15, 45, 50, 55, 60, 65, 70, 75, 80, 85, or 90 minutes to provide an aged precipitate. In embodiments, the hold time is greater than or equal to about 45, 50, 55, 60, 65, 70, 75, 80, 85, or 90 minutes to provide an aged precipitate.

In embodiments, the iron nitrate solution is prepared from spent 'scrap' iron sources. In embodiments, the iron nitrate solution is prepared from commercially available fine iron powder. In embodiments, the iron nitrate solution is prepared such that all or some percentage of the solution comprises $Fe^{2+}$ (ferrous nitrate). In embodiments, the iron nitrate solution is prepared such that all or some percentage of the solution comprises $Fe^{3+}$ (ferric nitrate). In embodiments, a commercially available $Fe^{2+}$ or $Fe^{3+}$ solution is utilized as the acid. In embodiments, commercially available ferrous and ferric nitrate solutions are combined to produce the desired acid solution.

In embodiments, the temperature of precipitation or a combination of precipitation temperature and hold time at the precipitation temperature are varied to induce hematite formation. In some embodiments, the hot, freshly precipitated slurry is allowed to cool, i.e. without forced cooling, or with controlled cooling, to induce the desired amount of hematite. In embodiments, one or more promoters are added prior to or directly following precipitation in order to induce hematite formation. The one or more promoters may be selected from aluminum, chromium, manganese, silica, copper, zinc, zirconium, additives including, but not limited to, the amino acid cysteine and thiols, including, but not limited to, n-BuSH and iBu-SH, and combinations thereof. In embodiments, the one or more promoter is selected from colloidal acidic silica, basic silica, waterglass (i.e. sodium silicate, $Na_2SiO_3$), and potassium water glass (i.e. potassium silicate, $K_2SiO_3$). In embodiments, the hematite promoter comprises one or more component selected from alumina, titania, manganese, and colloidal alumina. In embodiments, a desired quantity of one or more promoter(s) is utilized in conjunction with a precipitation hold time to induce a desired hematite content. In embodiments, the one or more promoter(s) induces hematite after a heat treatment step. In embodiments a promoter may be added after a specific hold time, for example, to prevent the formation of hematite beyond a desired level. In embodiments, the precipitation is a low temperature precipitation, wherein the precipitating temperature is less than or equal to about 20° C., 30° C., 40° C., 50° C., 60° C., or 65° C. In embodiments, the precipitation is a low temperature precipitation, wherein the precipitating temperature is in the range of from about 20° C. to about 65° C. In embodiments, the precipitation is performed 'hot', at less than or equal to about 65° C., 75° C., 85° C., or 95° C., or even with higher temperature (e.g. boiling) solutions. In embodiments, the precipitation is performed 'hot', at a temperature in the range of from about 65° C. to about 95° C. In embodiments, the freshly formed precipitate is heated to higher temperature than the precipitation temperature. In embodiments, the method comprises filtration of the precipitation mother liquor (e.g. salt rich liquids) before reslurrying and aging of the reslurried cake. The method may further comprise washing the aged precipitate via contact with a wash solution, to provide a washed catalyst; promoting the washed catalyst with a chemical promoter; promoting the washed catalyst with a structural support; spray drying the promoted catalyst; calcining the spray dried catalyst to provide a calcined hematite-containing Fischer-Tropsch catalyst; or a combination thereof. These steps will be described in more detail hereinbelow.

Precipitating Precipitate.

The herein disclosed method comprises precipitating a precipitate by combining an iron nitrate solution with a precipitating agent solution at a precipitating temperature to form a precipitate comprising iron phases. In embodiments the iron nitrate solution is co-precipitated (e.g. co-fed at a substantially constant pH) with the precipitating agent solution. In embodiments the iron nitrate solution is added to the precipitating solution. In embodiments the precipitating agent solution is added to the iron nitrate solution. The step of precipitating may further comprise preparing one or more nitrate solutions containing iron and, in some embodiments, copper nitrates; preparing precipitating agent; and/or heating one or more of the solutions prior to precipitating. In embodiments, the ratio of percent $Fe^{2+}$ to percent $Fe^{3+}$ is controlled as described in U.S. patent application Ser. No. 12/474,440, the disclosure of which is incorporated herein for all purposes not contrary to this disclosure. Without wishing to be limited by theory, an increased $Fe^{2+}:Fe^{3+}$ ratio may provide an increased ratio of lepidocrocite ($\gamma$-FeOOH) and/or magnetite ($Fe_3O_4$) relative to goethite ($\alpha$-FeOOH) and/or ferrihydrite ($Fe_5HO_8 \cdot 4H_2O$) in the precipitated catalyst. Upon heating, lepidocrocite and/or magnetite may form maghemite ($\gamma$-$Fe_2O_3$), while goethite and/or ferrihydrite may form hematite ($\alpha$-$Fe_2O_3$). Thus, in embodiments, the iron nitrate solution comprises Fe(III) nitrate. In embodiments, the iron nitrate solution comprises primarily Fe(III) nitrate. In embodiments, the iron nitrate in the iron nitrate solution comprises substantially all Fe(III) nitrate. In embodiments, the iron nitrate solution also comprises copper nitrate, and copper phases (e.g. copper oxides) are co-precipitated along with the iron phases during precipitation.

Copper may be added to the catalyst in any manner known to those of skill in the art. For example: (1) copper metal from a suitable source can be added to the iron and dissolved in the same nitrate solution prior to precipitation; (2) copper nitrate solution can be prepared separately and added to the iron nitrate solution prior to precipitation; (3) copper nitrate may be added to the precipitate after precipitation, and prior to spray drying; or (4) copper may be added using any combination of (1) through (3). In embodiments, copper is added as copper nitrate just prior to spray drying. The copper nitrate may be added after precipitation and filtration. In embodiments, the copper nitrate is added with chemical promoter.

The copper preferably contains no more than 1% impurities. The copper may act as an activation promoter in the catalyst. The weight ratio of copper to iron may be in the range of from 0.002 to 0.02, from 0.005 to 0.015, or from 0.0075 to 0.01.

If there exists significant sedimentation or cloudiness in the nitrate solution(s), the solution may be filtered to remove solids from the solution prior to combination with the precipitating solution.

Silica is a well known structural stabilizer for precipitated iron catalysts. Without wishing to be limited by theory, the presence of silica is believed to disperse the active metal sites and improve the general catalyst surface characteristics (e.g. BET surface area, pore volume, and pore size), inhibit excessive sintering of the active metal phase, and improve the structural integrity of the catalyst during the run. In embodiments, the iron nitrate solution also comprises a source of silica support material, and silica may be co-precipitated along with the iron phases during precipitation. In embodiments, silica is added subsequent to precipitation, and in embodiments, later in the preparation, such as prior to spray drying. Silica may be added to the catalyst in any manner known to those of skill in the art. Inclusion of silica generally provides catalytic systems that are more difficult to activate and lowers the higher hydrocarbon productivity of the catalyst. To improve the reducibility and induction of the catalyst, higher levels of copper (e.g. between 1 and 10 weight percent of the total amount of metal present) are typically added. Similarly, potassium is also often introduced at higher quantities, typically 1 to 10 weight percent of the total amount of active metal present, to improve the higher hydrocarbon productivity.

In embodiments, the silica comprises a colloidal silica selected from the family of BINDZIL® products, the family of LUDOX® products, TEOS, or a combination thereof. BINDZIL® and LUDOX® grades of colloidal silica are aqueous dispersions that cover an extensive range of properties including concentration, particle size, particle size distribution, solution pH, stabilizing ions, and surface treatments. More specifically, in embodiments, the colloidal silica (e.g. BINDZIL® colloidal silica) comprises from about 20 to about 40 weight percent $SiO_2$, or from about 30 to about 40 weight percent $SiO_2$; from about 0.2 to about 0.8% $Na_2O$, and/or less than about 0.8, 0.7, 0.6, or 0.5 weight percent $Na_2O$; a pH in the range of from about 8 to about 12; a specific gravity in the range of from about 1.1 to about 1.4, and/or a density of about 1.2 g/cm³; a surface area in the range of from about 100 m²/g to about 300 m²/g, or in the range of from about 250 m²/g to about 350 m²/g; a viscosity of less than or equal to about 12, 11, 10, 9, 8, 7, 6, or 5 centipoise (cP); or some combination thereof. In embodiments, the colloidal silica (e.g. LUDOX® colloidal silica) comprises from about 20 to about 40 weight percent $SiO_2$, or from about 30 to about 40 weight percent $SiO_2$; from about 0.01 to about 0.1 weight percent $Na_2SO_4$; a pH in the range of from about 8 to about 12; a specific gravity in the range of from about 1.1 to about 1.4, and/or a density of about 1.2 g/cm³; a surface area in the range of from about 100 m²/g to about 300 m²/g, or in the range of from about 250 m²/g to about 350 m²/g; a viscosity of less than or equal to about 12, 11, 10, 9, 8, 7, 6, or 5 centipoise (cP); or some combination thereof.

Precipitating may further comprise preparing precipitating agent (chemical base) solution. In embodiments, the precipitating agent solution is a 2-10 M aqueous solution. Suitable agents include, but are not limited to, $NH_4OH$, $Na_2CO_3$, NaOH, $K_2CO_3$, KOH, $(NH_4)_2CO_3$, $(NH_4)HCO_3$, $NaHCO_3$ and $KHCO_3$. In embodiments, the precipitating agent solution comprises sodium carbonate.

The precipitating agent solution (base solution; e.g. ammonium hydroxide) and the iron nitrate solution may be separately brought to temperatures in the range of ambient to near boiling. For example, in some instances the temperature is in the range of from about 20° C. to about 95° C. (or boiling), or from about 20° C. to about 75° C. The temperatures of the nitrate solution and the precipitating agent solution may be the same or different. In some instances, the temperature of the precipitating agent solution is about 25° C., for example.

The catalyst preparation method may comprise heating the iron nitrate solution to a temperature in the range of about 20° C. to 95° C., or from about 20° C. to 80° C. In embodiments, the iron nitrate solution is heated to a temperature in the range of from about 40° C. to about 95° C., or from about 40° C. to 80° C. In embodiments, the iron nitrate solution is heated to a temperature of about 40° C. In embodiments, the iron nitrate solution is heated to a temperature of about 55° C. In embodiments, the temperature of the precipitation mixture is maintained in the range of from about 25° C. to about 95° C., or in the range of from about 25° C. to about 80° C. In embodiments, the iron nitrate solution is heated at a rate of temperature increase in the range of from 1° C./min to 20° C./min. In certain embodiments, the iron nitrate solution is heated to about 70° C. at a rate of about 3° C./min. In embodiments, the iron nitrate solution is heated to a temperature in the range of 60° C. to 95° C. at a rate of temperature increase in the range of from about 1° C./min to about 20° C./min. In embodiments, the iron nitrate solution is heated to a temperature in the range of 60° C. to 80° C. at a rate of temperature increase in the range of from about 1° C./min to about 20° C./min. In some instances, the solution is heated to a temperature of 70° C. at a rate of increase of about 3° C./min. In embodiments, after heating, the resulting iron nitrate solution has a $Fe^{2+}$:$Fe^{3+}$ ratio in the range of about 0.01%:99.99% to about 100%:0% (w/w). In embodiments, the resulting iron nitrate solution has a $Fe^{2+}$:$Fe^{3+}$ ratio in the range of about 3%:97% to about 80%:20% (w/w). In other embodiments, the resulting iron nitrate solution has a $Fe^{2+}$:$Fe^{3+}$ ratio in the range of about 3%:97% to about 30%:70% (w/w).

The temperatures of the iron nitrate solution and/or the precipitation agent solution may be reduced to respective temperatures in the range of 25° C. to 35° C., to obtain respective low temperature solutions, and combined to produce a precipitate comprising iron phases (e.g. $Fe^{2+}$ and/or $Fe^3$ hydroxides) and, when co-precipitated with copper, one or more copper phase (e.g. copper hydroxide) by reacting the low temperature nitrate solution with the low temperature precipitating agent at a temperature not exceeding 40° C.

In embodiments, the base solution (precipitating agent solution), at a temperature in the range of ambient to near boiling, is gradually added to the iron nitrate solution to carefully precipitate the iron. In some instances the temperature of the iron solution is about 35° C. and the temperature of the base solution is about 25° C., for example. The pH of the mixture after precipitation may be in the range of from about 6.5 to about 9.0. For example, in some embodiments, the precipitation pH is about 6.9-7.1. The base solution may be added gradually to the nitrate solution. For example, the base solution may be added to the nitrate solution over a period of from about 5 to about 180 minutes. In embodiments, the base solution is added gradually, for example, over a time of from about 20 to about 120 minutes. In alternative embodiments the acid solution is added to the base solution, for example, at the temperatures delineated hereinabove. In embodiments the acid and base solutions are co-precipitated (e.g. co-fed at a substantially constant pH), for example, at the temperatures delineated hereinabove. In embodiments the acid is added to the precipitating agent solution within about 10 to 15 minutes, and in embodiments is added within about 5 to 10 minutes, for example at the temperatures delineated hereinabove.

Low temperature precipitation may allow for greater control over pH during the precipitation procedure than possible with catalyst preparation methods in which the temperatures are close to the boiling points of the nitrates and the base, respectively. The low temperature precipitation may also allow for improved copper retention, an increase in crystallinity, an increase in pore size, a decrease in surface area, a decrease in pore volume, a decrease in crystallite size and/or a combination thereof in the resulting catalyst particles.

Precipitation Temperature.

As noted hereinabove, in embodiments, the temperature of precipitation or a combination of precipitation temperature and hold time at the precipitation temperature are varied to induce desired hematite formation, with desired quantities in the range of from about 0.5 to about 70 weight percent hematite.

Precipitation Time:

As noted hereinabove, in embodiments, the time of precipitation or a combination of precipitation time and hold time at the precipitation temperature are varied to induce hematite formation, with desired quantities in the range of from about 0.5 to about 70 weight percent hematite.

Aging/Holding the Precipitate.

As noted hereinabove, it has been unexpectedly discovered that, in embodiments, aging the precipitate by holding the precipitation mixture (prior to filtration/washing) at a suitable hold temperature for an adequate hold time allows for a controlled increase in hematite content of the resulting catalyst that benefits Fischer-Tropsch catalysis. Without wishing to be limited by theory, it appears that the catalyst particles formed during precipitation continue to grow and change during the hold time, while maintained in the liquid from which they precipitated. Without wishing to be limited by theory, it is postulated that exposure of the freshly formed precipitate to the 'nitrate component' in the slurry may accelerate the transformation of the freshly formed oxyhydroxide metal to hematite. The changes brought about by aging may be beneficial in controllably increasing the hematite content from about 0.5 wt. percent to about 70 wt. percent, and providing average crystalline size of the raw catalyst in the range of from about 10 nm to about 70 nm, as further described hereinbelow. In embodiments, the hold time is greater than or equal to about 5, 10, 15, 45, 50, 55, 60, 65, 70, 75, 80, 85, or 90 minutes. In embodiments, the hold temperature is a temperature of greater than or equal to about 70° C., 75° C., 80° C., 85° C., 90° C., or 95° C. In embodiments, the hot, freshly precipitated slurry is cooled under its own dynamic and/or with controlled cooling to control the rate of cooling in an effort to induce a desired level of hematite in the resulting catalyst. In embodiments a promoter is added after a specific hold time at a specific temperature to stop the formation of hematite beyond a specific chosen level.

Promoting the Precipitate.

As mentioned hereinabove, in embodiments, a desired amount of one or more promoter(s), such as, but not limited to, aluminum, chromium, manganese, silica, copper, zinc, zirconium and additives, including, but not limited to, amino acid cysteine, and thiols, including, but not limited to, n-BuSH and iBu-SH, is (are) added prior to or directly following precipitation to induce the hematite formation. In embodiments, a promoter (or a combination of promoters) at a desired quantity is utilized in conjunction with a precipitation hold time to induce a desired hematite content. In embodiments, promoter and promoter combinations in desired quantities induce hematite formation after a heat treatment step. In embodiments, for example, utilization of $Al_2O_3$ promoter quantities in the range of from about 1 to about 30 percent, or even as low as 2 to 10 percent, results in the formation of hematite. In embodiments a combination of one or more of the precipitation temperature, the precipitation time, the hold time after precipitation, and a promoter of choice is/are controlled in order to induce hematite formation, in embodiments providing hematite in the range of from about 0.5 to about 70 weight percent hematite.

Filtering and Washing.

In some embodiments, the disclosed hematite-containing FT catalyst production method further comprises washing the aged precipitate. The precipitated mixture comprising iron hydroxides, goethite and/or ferrihydrite and lepidocrocite and/or magnetite and/or hematite and, in some embodiments, copper hydroxides, may be filtered and washed to remove residual nitrates. The slurry containing the precipitate may be first pumped from the precipitation vessel into a holding tank located, for example, upstream of a vacuum drum filter. The precipitate may be allowed to settle in the holding tank, allowing a clear layer of nitrate solution to form above the solids. This layer may be drawn off before the slurry is washed and filtered. A vacuum drum filter fitted with water spray bars may be used for washing the aged catalyst and concentrating the slurry. To determine when nitrates have been sufficiently removed, the conductivity of the filtrate may be monitored. The conductivity of the wash water may be reduced to less than 40 micro mhos or less than 20 micro mhos. It has been determined that inadequately washed filter cakes demonstrate poor stability with time on-line. Desirably, the washed filter cake comprises a sodium content of less than or equal to about 0.30 wt. percent, less than or equal to about 0.20 wt. percent, or less than or equal to about 0.15 wt. percent sodium in the final catalyst. Alternatively, the pH of the filtrate may be utilized to determine adequate (e.g. substantially complete) removal of nitrates. As noted hereinabove, it has been discovered that the delay time between the precipitation step and the filtration step can significantly impact the quantity of hematite formed and present in the final catalyst.

As noted hereinabove, it has been discovered, that aged precipitates containing hematite typically wash to (have) reduced sodium contents (e.g. less than about 0.15 weight percent sodium), while conventional hematite-free materials tend to comprise from about 0.30 to 0.50 wt. percent sodium. Thus, in embodiments, the inventive method may facilitate precipitate washing (see Table 1 hereinbelow).

TABLE 1

Impact of Hematite-Containing versus Hematite-Free Slurries on the Final Sodium Content and Solids Content of the Washed Filter Cake

| Batch # | % Na | % Solids |
|---|---|---|
| Hematite-Containing | | |
| HC1 | 0.05 | 23.5 |
| HC2 | 0.06 | 27.7 |
| HC3 | 0.05 | 22.1 |
| HC4 | 0.01 | 24.9 |
| HC5 | 0.4 | 23.5 |
| HC6 | 0.01 | 21.8 |
| HC7 | 0.02 | 22.5 |
| HC8 | 0.04 | 23.4 |
| HC9 | 0.07 | 24.2 |
| HC10 | 0.03 | 27.9 |
| Ave | 0.07 | 24.15 |
| Std. Dev. | 0.12 | 2.14 |
| Hematite-Free | | |
| HF1 | 0.37 | 19.72 |
| HF2 | 0.26 | 20.63 |
| HF3 | 0.40 | 19.98 |
| HF4 | 0.30 | 20.63 |
| HF5 | 0.23 | 21.84 |
| HF6 | 0.20 | 21.42 |
| HF7 | 0.20 | 21.82 |
| HF8 | 0.32 | 20.94 |
| HF9 | 0.30 | 21.22 |
| HF10 | 0.24 | 21.82 |
| Ave | 0.28 | 21.00 |
| Std. Dev. | 0.06 | 0.72 |

The washed precipitate containing hematite may comprise a higher solids content than conventional, un-aged precipitates (see Table 1 hereinabove). This higher solids content enables the spray drying of catalyst particles that are denser and/or exhibit a greater sphericity. In embodiments, the solids content of the hematite-containing filter cake is in the range of from about 25 weight percent to about 35 weight percent, depending on hematite content. The solids content of conventional, hematite-free (or low hematite) filter cakes is typically in the range of from about 19 weight percent to about 21 weight percent. In embodiments, the washed catalyst comprises a solids content of greater than about 21 weight percent. In embodiments, the washed catalyst precipitate comprises a solids content of greater than about 25 weight percent. In embodiments, the washed catalyst precipitate comprises a solids content in the range of from about 25 weight percent to about 35 weight percent.

In some embodiments, washed precipitate is aged. Aging may comprises aging for a period of time ranging from 5, 10, or 15 minutes to 30 days. In embodiments, aging may comprise aging for a period of time ranging from 5, 10, or 15 minutes to 240 minutes. In embodiments, the washed filter cake obtained from the washing is allowed to age, e.g. for a period of time between 5 minutes and 240 minutes. In embodiments, the washed/filtered catalyst is aged for about 30 minutes.

Chemically Promoting (Alkalizing).

In embodiments, the catalyst preparation method comprises re-slurrying the precipitate with and/or adding a chemical promoter. In embodiments, the chemical promoter comprises potassium. The chemical promoter may be selected from potassium compounds including, but not limited to, $K_2CO_3$, $KHCO_3$, and KOH. The weight ratio of potassium to iron in the slurry may be such that the calcined catalyst comprises a mass ratio of from about 1 $K_2O$:100 Fe to about 10 $K_2O$:100 Fe, or from about 1 $K_2O$:100 Fe to about 7 $K_2O$:100 Fe for examples. In some embodiments, the washed catalyst, comprising the iron and optionally copper phases, is slurried in a potassium-containing alkaline solution.

As mentioned hereinabove, all or a portion of the copper desired in the hematite-containing FT catalyst may be added as copper nitrate at this stage if not or in addition to co-precipitation with iron phases. In embodiments, copper is added as copper nitrate solution after precipitation and filtration, but prior to spray drying.

Drying and Sizing.

The catalyst method may comprise drying the slurry to form a dried catalyst. In embodiments, the dried catalyst comprises particles having a size distribution of from about 10 microns to about 100 microns.

In embodiments, e.g. within 24 hours of preparing the chemically-promoted catalyst solids slurry, the promoted slurry is spray dried to form spherical particles. In some embodiments, copper is added as copper nitrate just prior to spray drying. The spray dried particles may have a size distribution between 1 and 50 microns in diameter, with an average size of about 30 microns. The catalyst may have a particulate structure with a particle size distribution in the range of from about 10 μm-100 μm.

In embodiments, less than 10% by weight of the particles are smaller than 45 microns and less than 10% by weight of the particles are larger than 100 microns. In embodiments, the median particle diameter is in the range of from about 60 microns to about 90 microns; in embodiments the median diameter is in the range of from about 70 microns to about 80 microns; and in embodiments the median diameter is in the range of from about 45 to about 55 microns. Air classification of the dried catalyst may be used to achieve the desired particle size distribution. The dried particles may have a moisture content of less than about 20% by weight, less than about 10% by weight, or less than about 5% by weight. Alternate means may be used for drying and sizing that will produce like particles. In embodiments, the fine material from classification is recycled back to the aforementioned promotion step. In embodiments, the fine material from classification is dry milled and/or wet milled prior to being recycled back to the aforementioned promotion step. In embodiments, the recycle classification fines have a particle size up to about 30 microns. In embodiments, the recycle classification fines have a particle size up to about 20 microns. In embodiments, the recycle classification fines have a particle size below 20 microns.

Figure 1A:
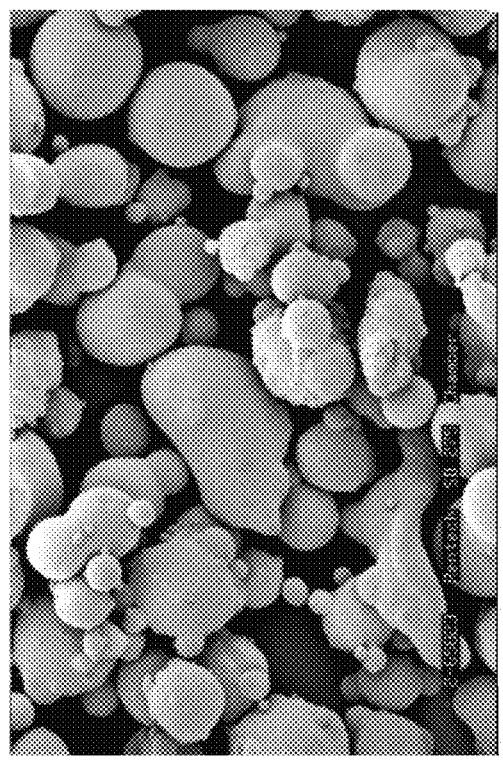

As noted hereinabove, the sphericity of the herein disclosed hematite-containing FT catalyst may be greater than conventional hematite-free catalyst. In embodiments, a herein disclosed hematite-containing FT catalyst (e.g., 35±5 wt. percent hematite) has a sphericity of greater than or equal to about 0.8, 0.85, 0.9, or 0.95. FIG. 1A is a SEM micrograph of spray dried catalyst particles resulting from a hematite-free slurry, while FIG. 1B is a SEM micrograph of spray dried catalyst particles resulting from a hematite-containing slurry. It is apparent that the particles of FIG. 1B have greater sphericity than those of FIG. 1A.

Calcining.

The herein disclosed catalyst preparation method may further comprise calcining the spray dried catalyst particles. The spray dried catalyst may be calcined via any methods known to those of skill in the art. In embodiments, the dried catalyst particles are calcined at a temperature in the range of from about 300° C. to about 550° C., or from about 300° C. to about 420° C., with gradual ramping of the temperature from ambient temperature. In some instances, the temperature is increased to the calcining temperature at a rate between 0.5° C./min and 80° C./min. In embodiments, the ramp rate is between 5° C./min and 50° C./min, or between 10 and 40° C./min.

Once the desired calcining temperature has been attained, the temperature may be held for a time period. In embodiments, the catalyst is maintained at the calcination temperature for a dwell time period in the range of from about 0.5 hour to about 24 hours. In embodiments, a rotary calciner is utilized, and the calcination dwell time is from about 0.5 hour to about 1.5 hours. In certain embodiments, the dwell time is in the range of from about 3 to about 6 hours. In other embodiments, the dwell time is a time in the range of from about 4 hours to about 5 hours. In embodiments, the dried catalyst particles are calcined for up to 16 hours. In some embodiments, the dwell time is about 24 hours.

In embodiments, calcining comprises: ramping the temperature at a rate in the range of from about 0.1° C./min to about 80° C./min to a maximum temperature in the range of from about 300° C. to about 550° C., or from about 300° C. to about 420° C., and holding at the maximum temperature for at least 4 hours. In embodiments, calcining comprises a two-step calcination program wherein the catalyst is heated to a selected maximum temperature twice, with gradual cooling of the catalyst between the calcinations.

Without wishing to be limited by theory, it is postulated that calcining removes tightly bound water from the particles transforming goethite ($\alpha$-FeOOH) and/or ferrihydrite ($Fe_5HO_8 \cdot 4H_2O$) into hematite ($\alpha$-$Fe_2O_3$) and transforming lepidocrocite ($\gamma$-FeOOH) and/or magnetite ($Fe_3O_4$) into maghemite ($\gamma$-$Fe_2O_3$). Calcining may impart strength to the particles.

In embodiments, a multi-step calcination program is carried out. For example, two passes may be made in a rotary calciner to simulate rapid heat up in a fluidized bed. The catalyst may first be calcined at a first calcining temperature (e.g. about 320° C.) for a first time period (e.g. 0.5 hours), the temperature ramped from ambient temperature at a first ramp rate of increase (e.g. about 10° C./min), followed by cooling to room temperature and a second calcining at a second calcining temperature (e.g. about 320° C.) for a second time period (e.g. 8 hours), with a second ramp rate (e.g. about 0.5° C./min). A multi-step calcining program such as this may broaden the pore diameter of the particles.

Activating the Catalyst.

The method of providing hematite-containing FT catalyst may further comprise activating the calcined catalyst. The activation may be two- or three-phase. As known to those of skill in the art, activating the calcined catalyst may be effected by exposing the calcined catalyst to a gas comprising carbon monoxide, hydrogen, or a combination thereof, for a selected period of time at selected levels of pressure, temperature, and space velocity sufficient to enhance catalytic activity and stability for hydrogenating carbon monoxide to form higher hydrocarbons. Any activation method known to those of skill in the art may be utilized.

In embodiments, the activation comprises one or more of the following steps. The reactor is pressurized at 0-350 psig, and the slurry heated under $N_2$ to 150° C. to 200° C. at 0.5° C./min to 5.0° C./min. At this temperature, syngas is introduced over about 5 hours. The syngas may comprise a molar ratio of $H_2$/CO in the range of from about 0.60 to about 2.1, with inert content in the range of from about 5 mole percent to about 45 mole percent, and a space velocity (SV) in the range of from about 1.5 $Nl_{tot}/g_{cat}$ to about 6.0 $Nl_{tot}/g_{cat}$. With the syngas introduced, the slurry is heated to the activation temperature of 220-280° C. at about 0.10 to about 5.0° C./min, whereat the temperature is held for 1 to 15 hours. After the hold time is completed, the reactor cooled down at a rate of 0.01 to 1.0° C./min to the reaction temperature of 220 to 255° C. Once the reaction temperature is reached, the syngas, SV and $H_2$/CO molar ratio (if different than the activation molar ratio of $H_2$/CO) are ramped to the reaction SV and molar $H_2$/CO ratio within a time period of from about 0.5 to 24 hrs. The pressure is set to the reaction pressure of 300 to 400 psig at 15 psi/h over a time period of from 1 to 24 hrs. For the evaluations discussed further hereinbelow, the reactor conditions are set at 220 to 255° C., 300 to 400 psig, 0.60 to 2.1 $H_2$/CO molar ratio, and 2.0 to 6.0 $Nl_{tot}/g_{cat}$. In embodiments the syngas inert content comprises methane, carbon dioxide, nitrogen, or a combination thereof in the range of from about 5 to about 45 mol %.

Alternatively the catalyst may be activated in the three phase mode in the reactor slurry phase in a two step process by reducing the catalyst with hydrogen, followed with syngas induction. Typically the reactor is pressurized with $N_2$ at 70 to 210 psig, and then the slurry is heated in 10 to 100% $H_2$ from ambient temperature to 250° C. at 0.10 to 5.0° C./min. The slurry is held at the pretreatment temperature for about 2 to 10 hours. The reactor then cooled down to about 210° C. At this temperature, syngas is introduced over about 6 hours with a 0.60 to 2.1 $H_2$/CO molar ratio, inert content, and SV of 1.5 to 6.0 $Nl_{tot}/g_{cat}$. With the syngas introduced, the slurry is heated to the induction temperature of 220° C. to 280° C. at 0.11° C./min, whereat the temperature is held for about 1 to 15 hours. After the hold time is completed, the reactor cooled down at a rate of 0.01° C./min to 1.0° C./min to the reaction temperature of 220° C. to 255° C. Once the reaction temperature is reached, the syngas, SV and molar $H_2$/CO ratio (if different than the activation molar ratio of $H_2$/CO) are ramped to the reaction SV and $H_2$/CO molar ratio within about 0.5 to 24 hrs. The pressure is then ramped from 0 to 350 psig to the reaction pressure of 300-400 psig at about 15 psig/min.

Alternatively the catalyst maybe activated in the two phase mode externally from the Fischer-Trospch slurry bed reactor in a fixed fluidized bed reactor with hydrogen, followed with syngas induction in the CSTR. The catalyst is fluidized with $N_2$ in a fixed fluidized bed reactor at a superficial velocity (Ug) of about 0.8 to 2.0 cm/s at atmospheric pressure. A constant feed flow (scfm) to the reactor during the entire testing period is maintained. The catalyst is first dried by heating the reactor under $N_2$ to 220° C. (2° C./min). When $H_2O$ formation is less than a target of about 10 ppm, which is measured by moisture analyzer, the reactor is cooled down to room temperature. At room temperature, the $N_2$ is replaced with 4% to 100% $H_2$ in $N_2$. The reactor is then heated to 200° C. to 280° C. by 0.1° C./min to 0.5° C./min. The water formation is monitored by the moisture analyzer in order to control the reduction step. The reactor is held at the reduction temperature for 2 to 10 hours. The reactor is then cooled down to room temperature and the catalyst is transferred to paraffin oil under inert. The syngas induction, which is conducted in the CSTR, is comparable with what is explained hereinabove.

Producing FT Hydrocarbons. The herein disclosed hematite-containing FT catalyst may be utilized as known in the art to produce FT hydrocarbons. Thus, also disclosed herein is a method of producing Fischer-Tropsch hydrocarbon product, the method comprising contacting a synthesis gas stream with the activated form of the herein disclosed catalyst in a Fischer-Tropsch slurry-bed reactor whereby a Fischer-Tropsch hydrocarbon product is obtained. Contacting the synthesis gas stream with the activated catalyst in the Fischer-Tropsch slurry-bed reactor whereby the Fischer-Tropsch hydrocarbon product is obtained may be carried out at a temperature in the range of from about 200° C. to about 270° C., a pressure in the range of from about 5 bar to about 50 bar, a ratio of hydrogen to carbon monoxide in the synthesis gas in the range of from about 0.5 to about 2.5, a space velocity in the range of from about 1 to about 10 $NL(H_2+CO)/h/g$ Fe, or a combination thereof. In embodiments, the FT synthesis is performed at a synthesis temperature of about 240° C.

Properties of the Hematite-Containing FT Catalyst.

The precipitation time (i.e. the time it takes to initially contact the acid and the base), the hold time (i.e. the time the catalyst precipitate is allowed to age in solution before washing and/or filtering), the hold temperature, the precipitation temperature, or a combination thereof may be manipulated such that the calcined catalyst comprises a desired weight percentage of hematite, comprises a desired hematite crystallite size, exhibits a desired reduction temperature, or a combination thereof. In embodiments, the disclosed hematite-containing FT catalyst comprises more than about 0.5, 1.0, 10, 15, 25, 26, 27, 28, 29, 30, 35, or 40 weight percent hematite. In embodiments, the disclosed hematite-containing FT catalyst comprises more than about 25, 26, 27, 28, 29, 30, 35, or 40 weight percent hematite. The catalyst may contain from about 0.5 weight percent to about 70 weight percent hematite. The catalyst may contain from about 1 weight percent to about 70 weight percent hematite. In embodiments, the disclosed hematite-containing FT catalyst comprises from about 20 weight percent to about 70 weight percent hematite.

The herein disclosed catalyst (e.g. calcined catalyst) may exhibit an average hematite crystallite size in the range of from about 1 nm to about 70 nm, or from about 1 nm to about 50 nm. In embodiments, the disclosed hematite-containing FT catalyst comprises an average hematite crystallite size of greater than or equal to about 15, 18, 20, 21, 22, 23, 24, 25, 27, or 27 nm. In embodiments, the disclosed hematite-containing FT catalyst comprises an average hematite crystallite size of greater than or equal to about 20, 21, 22, 23, 24, 25, 27, or 27 nm.

The hematite-containing FT catalyst of this disclosure may comprise a weight ratio of copper to iron in the range of from about 1 Cu:100 Fe to about 10 Cu:100 Fe. The hematite-containing FT catalyst of this disclosure may comprise a weight ratio of copper to iron in the range of from about 1 Cu:100 Fe to about 5 Cu:100 Fe. The hematite-containing FT catalyst of this disclosure may compromise a weight ratio of copper to iron in the range from about 5 Cu:100 Fe to 10 Cu:100 Fe. As mentioned hereinabove, the hematite-containing FT catalyst of this disclosure may be promoted with potassium. In embodiments, the hematite-containing FT catalyst of this disclosure comprises a weight ratio of potassium (e.g. as $K_2O$) to iron in the range of from about 1 $K_2O$:100 Fe to about 10 $K_2O$:100 Fe. In embodiments, the hematite-containing FT catalyst of this disclosure comprises a weight ratio of potassium (e.g. as $K_2O$) to iron in the range of from about 1 $K_2O$:100 Fe to about 7 $K_2O$:100 Fe. As mentioned hereinabove, the hematite-containing FT catalyst of this disclosure may comprise silica as structural promoter. In embodiments, the hematite-containing FT catalyst of this disclosure comprises a weight ratio of silica to iron in the range of from about 0 $SiO_2$:100 Fe to about 35 $SiO_2$:100 Fe. In embodiments, the hematite-containing FT catalyst of this disclosure comprises a weight ratio of silica to iron in the range of from about 0 $SiO_2$:100 Fe to about 25 $SiO_2$:100 Fe. In embodiments the hematite-containing FT catalyst of this disclosure comprises a weight ratio of silica to iron in the range of from about 25:100 Fe to about 40 $SiO_2$:100 Fe. In embodiments, the hematite-containing Fischer-Tropsch catalyst comprises iron, copper, potassium, and silica with the weight ratios of 100 Fe:1-7 Cu:1-10 $K_2O$:0-35 $SiO_2$ (wt %:wt %:wt %:wt %), and/or the catalyst comprises from about 0.5% weight percent to about 70 weight percent hematite. In embodiments, the hematite-containing Fischer-Tropsch catalyst comprises iron, copper, potassium, and silica with the weight ratios of 100 Fe:1-5 Cu:1-7 $K_2O$:0-25 $SiO_2$ (wt %:wt %:wt %:wt %), and/or the catalyst comprises from about 1% weight percent to about 70 weight percent hematite.

As discussed further in the Example hereinbelow, the disclosed hematite-containing FT catalyst may exhibit an unexpectedly low reduction temperature. Without wishing to be limited by theory it is speculated that the amount and/or crystallite size of hematite in the FT catalyst may be weakening the interaction between the metal (Fe and/or Cu) and the support (silica) in such a way that the reducibility of the catalyst is gentler. In embodiments, the reduction temperature is lower than the FT synthesis temperature. In such an application, the hematite-containing FT catalyst may potentially be continuously rejuvenated under FT operating conditions during a synthesis run, providing long term run stability relative to conventional iron-based FT catalysts. The herein disclosed hematite-containing FT catalyst may exhibit a reduction temperature of less than or equal to about 250° C., 245° C., 240° C., 235° C., 230° C., 225° C. or 220° C. In embodiments, the hematite-containing Fischer-Tropsch catalyst exhibits a TPR of less than or equal to about 245° C., less than or equal to about 240° C., less than or equal to about 235° C., less than or equal to about 230° C., less than or equal to about 225° C., less than or equal to about 220° C., less than or equal to about 215° C., less than or equal to about 210° C., or less than or equal to about 200° C.

The herein disclosed uncalcined hematite-containing FT catalyst may have a BET surface area in the range of from about 50 m²/g to about 450 m²/g, from about 70 m²/g to about 350 m²/g, or from about 100 m²/g to about 300 m²/g, or from about 150 m²/g to about 250 m²/g.

The herein disclosed uncalcined hematite-containing FT catalyst may have a mean pore diameter in the range of from about 25 Å to about 120 Å, from about 30 Å to about 100 Å, or from about 50 Å to about 80 Å.

The herein disclosed uncalcined hematite-containing FT catalyst may have a mean pore volume in the range of from about 0.2 cc/g to about 0.8 cc/g, from about 0.3 cc/g to about 0.7 cc/g, or from about 0.4 cc/g to about 0.6 cc/g.

Benefits and Advantages.

The herein disclosed method may enable production of hematite-containing catalyst at a reduced cost relative to conventional FT catalyst production, and more specifically with respect to the washing process, reducing wash time, water use, or both. The disclosed catalyst may provide enhanced run time stability. For example, the disclosed catalyst may provide for a run time stability of greater than or equal to at least 1000 hours, or 2000 hours with a deactivation rate suitably low to benefit lower catalyst usage through the catalyst replacement program. Without wishing to be limited by theory, the run time stability may be enhanced and slower transformation of the active metal phase take place, and hence a reduction in sintering. Activation of the disclosed hematite-containing FT catalyst may provide an active phase that is beneficial to run time stability. Without wishing to be limited by theory, the active phase may comprise stable carbides of the $Fe_3C$ type, and inhibit the formation of the $\epsilon\text{-}Fe_{2.2}C$ type that is associated with catalyst deactivation. As noted hereinabove, under typical run conditions the herein disclosed catalyst is resistant to sintering, in embodiments exhibiting surface-average carbide sizes that increase at rates less than 0.10 nm/hr, 0.05 nm/hr, 0.023 nm/hr, or even lower rates, and with volume-averaged carbide sizes that increase at rates less than 0.10 nm/hr, 0.05 nm/hr, 0.033 nm/hr, or even lower rates. In embodiments, particle size distributions conform to log-normal distributions whose center does not increase above 40 nm, and more specifically 35 nm, during 2000 hours of operation. Moreover, following an increased stable run time, the deactivation rate of the herein disclosed hematite-containing FT catalyst may be reduced relative to that of a conventional, substantially hematite-free FT catalyst. In embodiments, utilization of the herein disclosed hematite-containing FT catalyst provides for FT synthesis with a run time catalyst replacement rate of less than about 5, 4, 3, 2, 1, 0.80 or 0.50 pound of FT catalyst per barrel of FT synthesis product.

The herein disclosed hematite-containing FT catalyst may exhibit enhanced attrition resistance relative to conventional hematite-free FT catalyst. For example, the herein disclosed hematite-containing FT catalyst may produce less than about 10, 8, or 5 wt. percent fines (catalyst particles of 5 μm or less) after 4000 hours of operation.

Production of FT hydrocarbons via the herein disclosed hematite-containing FT catalyst may provide improved C5+ productivity (and thus profit), such C5+ productivity defined as lbs C5+/lb. catalyst/hour. In embodiments, the herein disclosed hematite-containing FT catalyst provides a C5+ productivity of greater than or equal to about 0.14, 0.18, 0.21, 0.23, or 0.30 lbs C5+ product per lb. catalyst per hour. Production of FT hydrocarbons via the herein disclosed hematite-containing FT catalyst may provide reduced carbon dioxide selectivity, such carbon dioxide selectivity defined as the moles of carbon dioxide produced per moles of carbon monoxide converted. In embodiments, the herein disclosed hematite-containing FT catalyst provides a carbon dioxide selectivity of less than or equal to about 29, 24, or 19%. Production of FT hydrocarbons via the herein disclosed hematite-containing FT catalyst may provide enhanced C5+ selectivity, such C5+ selectivity defined as the moles of C5+ produced per moles of carbon monoxide converted. In embodiments, the herein disclosed hematite-containing FT catalyst provides a C5+ selectivity of greater than or equal to about 50, 55, or 60%. Production of FT hydrocarbons via the herein disclosed hematite-containing FT catalyst may provide enhanced CO conversion, such CO conversion defined as the moles of CO in the product divided by the moles of CO in the feed. In embodiments, the herein disclosed hematite-containing FT catalyst provides a CO conversion of greater than or equal to about 50, 55, or 60%.

An exemplary FT catalyst according to this disclosure may provide, for example after a time on stream in the range of from about 1000 to about 1100 hours (e.g., about 1026 hours), a CO conversion of greater than about 30 percent (e.g., a CO conversion of about 50%), a $CO_2$ selectivity of less than about 30 percent (e.g., a $CO_2$ selectivity of about 20%), a C5+ selectivity of greater than about 50 percent (e.g., about 60%), and/or a catalyst usage of less than about 0.5 lb. cat. per barrel of FT product.

EXAMPLES

Example 1

Seven inventive catalysts, IC1, IC2, IC3, IC4, IC5, IC6 and IC7, and one comparative catalyst, CC1, were prepared as described below. The hold time following precipitation was varied, as indicated in Table 2. The catalysts CC1, IC1, IC2, IC3, IC4, IC5, IC6, and IC7 have the composition: 100 Fe:5 Cu:5.7 $K_2O$:32 $SiO_2$. The catalyst IC8 (which is a 250 lbs dry basis scaled-up example) has the composition 100 Fe:5 Cu:5.0 $K_2O$:25 $SiO_2$.

This example delineates the steps in the preparation of representative catalysts IC1-IC7. The following reagents were employed: commercial iron nitrate solution (Shepherd, 7% Fe); commercial copper nitrate solution, (Shepherd, 14.9% Cu); sodium carbonate, $Na_2CO_3$ (Alfa Aesar), ACS reagent grade; nitric acid, 70% (Fisher), certified ACS PLUS grade; and deionized (DI) water. The catalysts were prepared according to the following procedure:

(1) Add 1304.0 g of DI water to 1257.14 g ferric nitrate solution. Mix 30.3 g copper nitrate solution slowly to ferric nitrate solution at ambient temperature with mechanical stirring. This constitutes 40 g/L Fe, 2 g/L Cu and 29.2 g/L excess $HNO_3$. The acid solution is then heated to as close to 85° C. as possible. For catalyst IC8, the nitrate solution was prepared from commercially available iron powder, as supplied (Hoganas, 98.61% Fe, −325 mesh). The preparation of which is described in U.S. Pat. Nos. 7,879,756; 7,968,611; and 8,138,115.

(2) A 95 g/L sodium carbonate solution, 264.7 g sodium carbonate plus 2786.4 g DI water, is prepared and heated to 85° C. For Catalyst IC8, a concentration of 115 g/L sodium carbonate solution was used.

(3) A quick co-feeding of acid and base solutions is performed at the constant pH of 8.8 (±0.5) and 85° C., while both of the solution temperatures are at 85° C. Desirably, the delay/residence time between resulting precipitation and washing should be between 5 and 15 minutes.

(4) The precipitate is held for 5, 15, 30, 45, 60, 90, or 120 minutes at the precipitation temperature before being removed to a filter device where it is filtered and washed with room temperature DI water until free of sodium and nitrates. The filtrate conductivity should be analyzed down to 40 (±10) μho.

(5) The filter residue is dried sufficiently so that it is easily removed from the filter material, but not so that it is totally dry. The filtered residue is reslurried to between 10-35 wt % solids content, promoted (chemical and/or structural), and spray dried as soon as possible.

(6) In the case of the control sample, CC1, the final washed and promoted filter cake should ideally contain around 0.5-1.0 weight percent hematite, as determined by XRD. In the case of the inventive samples, IC1-IC7, the final washed and promoted filter cake should ideally contain between 1.0 and 70 weight percent hematite, as determined by XRD.

(7) This mixture was spray dried to spherical particles using a Type H Mobile Niro spray dryer consisting of a two-fluid nozzle atomizer, drying chamber, air disperser, chamber, product collection section, air ducts, cyclone, exhaust fan, air heater, and instrument panel. Using the Type H Mobile Niro spray dryer, the "feed" was introduced through a nozzle from the bottom with the drying air cross flowing from the top under the following conditions: Inlet Temperature: 370° C. (±2); Outlet Temperature: 105° C. (±2); Slurry Solids Content: 11% (±1); Water Setup Flow 4.0 to 4.5 kg/hr (feed flow is set with water, and then switched to actual feed slurry); and Atomizer Air Flow at 1 bar pressure set between 2 and 6 kg/h, more preferably between 3 and 5 kg/h and most preferably between 3 and 4 kg/h. The spray dried material was then calcined by heating to 500° C. at 0.5° C./min and holding at that temperature for 4 hours.

Example 2

Two additional inventive catalysts, IC9 and IC10, were prepared as described hereinbelow. The hold time following precipitation was not varied, and kept constant at 15 minutes, as indicated in Table 2. Inventive catalysts, IC9 and IC10, had the compositions 100 Fe: 24 $Al_2O_3$ and the composition 100 Fe:15 Mn:6 Cr:3 $K_2O$:20 $SiO_2$:6 $Al_2O_3$ respectively.

This example delineates the steps in the preparation of representative catalysts IC9 and IC10. The following reagents were employed: commercial iron nitrate solution (Shepherd, 7% Fe); commercial copper nitrate solution, (Shepherd, 14.9% Cu); sodium carbonate, $Na_2CO_3$ (Alfa Aesar), ACS reagent grade; nitric acid, 70% (Fisher), certified ACS PLUS grade; and deionized (DI) water. The catalysts were prepared according to the following procedure:

(1) Add 1304.0 g of DI water to 1257.14 g ferric nitrate solution. Mix 36.28 g colloidal alumina slowly to ferric nitrate solution at ambient temperature with mechanical stirring. The acid solution is then heated as close to possible to 85° C.

(2) A 95 g/L sodium carbonate solution, 264.7 g sodium carbonate plus 2786.4 g DI water, is prepared and heated to 85° C.

(3) Other similar preparations included the oxides of chromium, manganese, silica, copper, zinc, zirconium and combination thereof. In some preparations the oxide is added during step 5 hereinbelow, and in some preparations during the promotion stage of step 8 hereinbelow. In some instances one or more additives like amino acid cysteine, and thiols like n-BuSH, iBu-SH is added during the precipitation step.

(4) A quick co-feeding of acid and base solutions is performed at the constant pH of 7.0 (±0.5) and 85° C. while both of the solution temperatures are at 85° C. Desirably, the delay/residence time between resulting precipitation and washing is between 5 and 15 minutes.

(5) The precipitate is held for 5, 15, 30, 45, 60, 75, 90 or 120 minutes at the precipitation temperature before removed to a filter device where it is filtered, and washed with room temperature DI water until substantially free of sodium and nitrates. The filtrate conductivity should be analyzed down to 40 (±10) μho.

(6) The filter residue is dried sufficiently so that it is easily removed from the filter material, but not so that it is totally dry. The filtered residue is reslurried to between 10-35 weight percent solids content, promoted (chemical and/or structural), and spray dried as soon as possible.

(7) The final washed and promoted filter cake contains between 1.0 and 70 weight percent hematite, as determined by XRD.

(8) This mixture was spray dried to spherical particles using a Type H Mobile Niro spray dryer consisting of a two-fluid nozzle atomizer, drying chamber, air disperser, chamber, product collection section, air ducts, cyclone, exhaust fan, air heater, and instrument panel. Using the Type H Mobile Niro spray dryer, the "feed" was introduced through a nozzle from the bottom with the drying air cross flowing from the top under the following conditions: Inlet Temperature: 370° C. (±2); Outlet Temperature: 105° C. (±2); Slurry Solids Content: 11% (±1); Water Setup Flow 4.0 to 4.5 kg/hr (feed flow is set with water, and then switched to actual feed slurry); and Atomizer Air Flow at 1 bar pressure set between 2 and 6 kg/h, more preferably between 3 and 5 kg/h and most preferably between 3 and 4 kg/h. The spray dried material was then calcined by heating to 500° C. at 0.5° C./min and holding at that temperature for 4 hours.

Example 3

A preparation similar to that of Example 1 and Example 2 is prepared wherein the precipitation mode is varied to include an acid into base precipitation using 95±5° C. solutions. A solution of about 42 g/L iron copper nitric acid is rapidly, within about 5 to about 15 minutes, precipitated into a solution of about 90 to about 115 g/L sodium carbonate. Thereafter, the fresh precipitate is aged for a time in the range of from about 5 and about 120 minutes, to allow for the development of hematite to between about 1 and about 70 weight percent, and crystallite size of less than about 10 to about 70 nm crystallite size. Following aging, the precipitate is introduced into a filter device, whereby it is filtered, and washed with room temperature DI water until substantially free of sodium and nitrates. The analyzed filtrate conductivity may be less than or equal to about 40 (±10) μho upon completion of filtration/washing. Alternatively, promoters, such as indicated in Example 1 and Example 2, or a combination of hold time and promoters, can be applied to stimulate a desired hematite formation. The filter residue is dried sufficiently so that it is easily removed from the filter material, but not so that it is totally dry. The filtered residue is reslurried to a solids content in the range of from about 10 to about 35 wt % solids, promoted (chemical and/or structural), and spray dried, desirably as soon as possible following filtration/washing. The spray dried material was then calcined by heating to 500° C. at 0.5° C./min, and holding at that temperature for 4 hours.

Discussion of the Results of Examples 1 and 2.

As can be seen from studying Table 2, inventive catalysts IC2, IC3, IC4, and IC5, for which the hold time was at least 30 minutes, exhibit a greater hematite crystallite size and percent hematite than comparative catalyst CC1 and inventive catalyst IC1.

Figure 2:
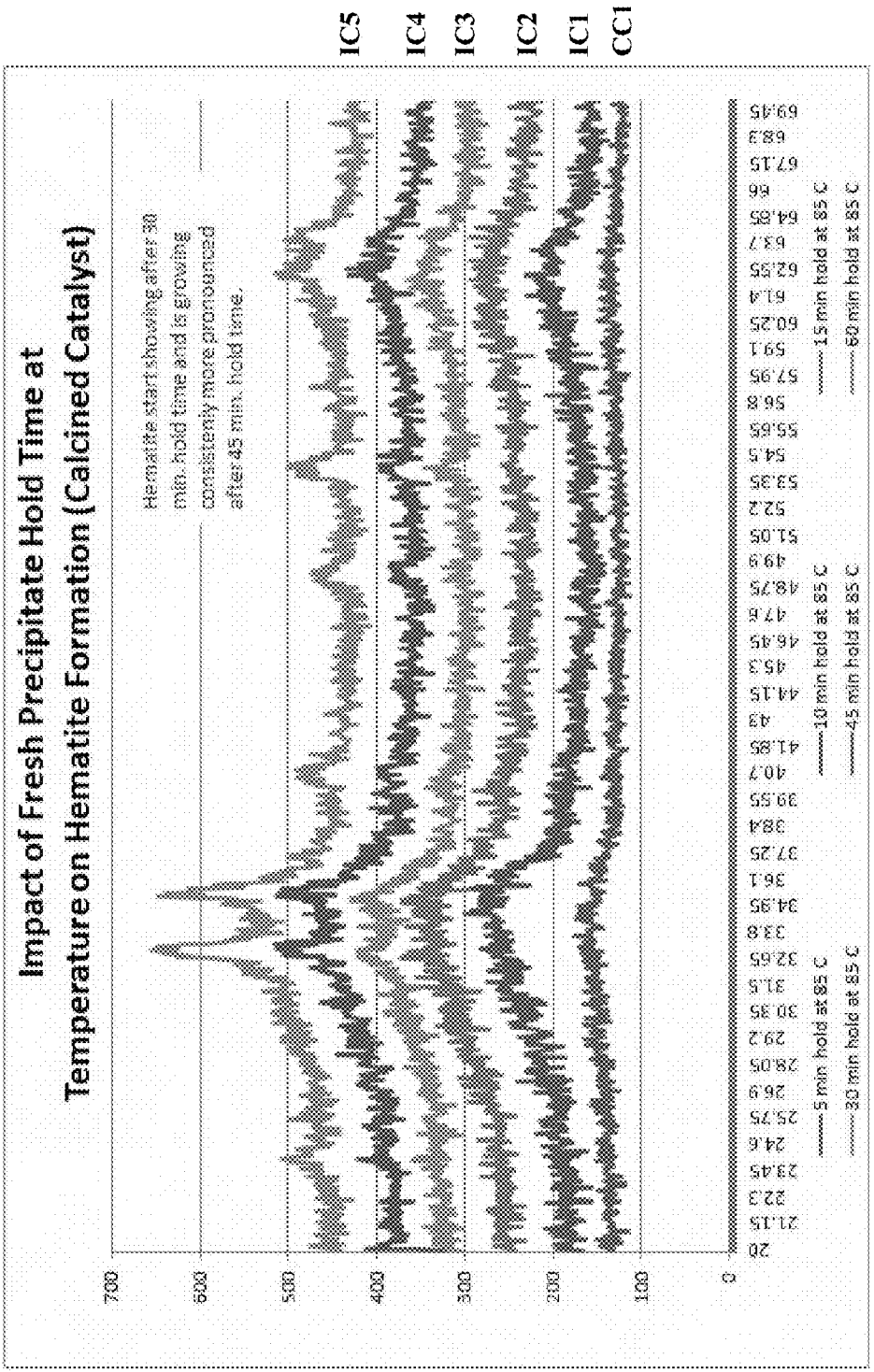
FIG. 2 is a plot of XRD patterns for the catalysts of Example 1.

The XRD of the catalysts according to Example 1 were determined according to the analytical methods outlined hereinbelow. FIG. 2 is a plot of the XRD patterns for the catalysts of Example 1. It can be seen that hematite appears with hold times above 30 minutes, growing increasingly pronounced with hold times of greater than about 45 minutes.

Figure 3:
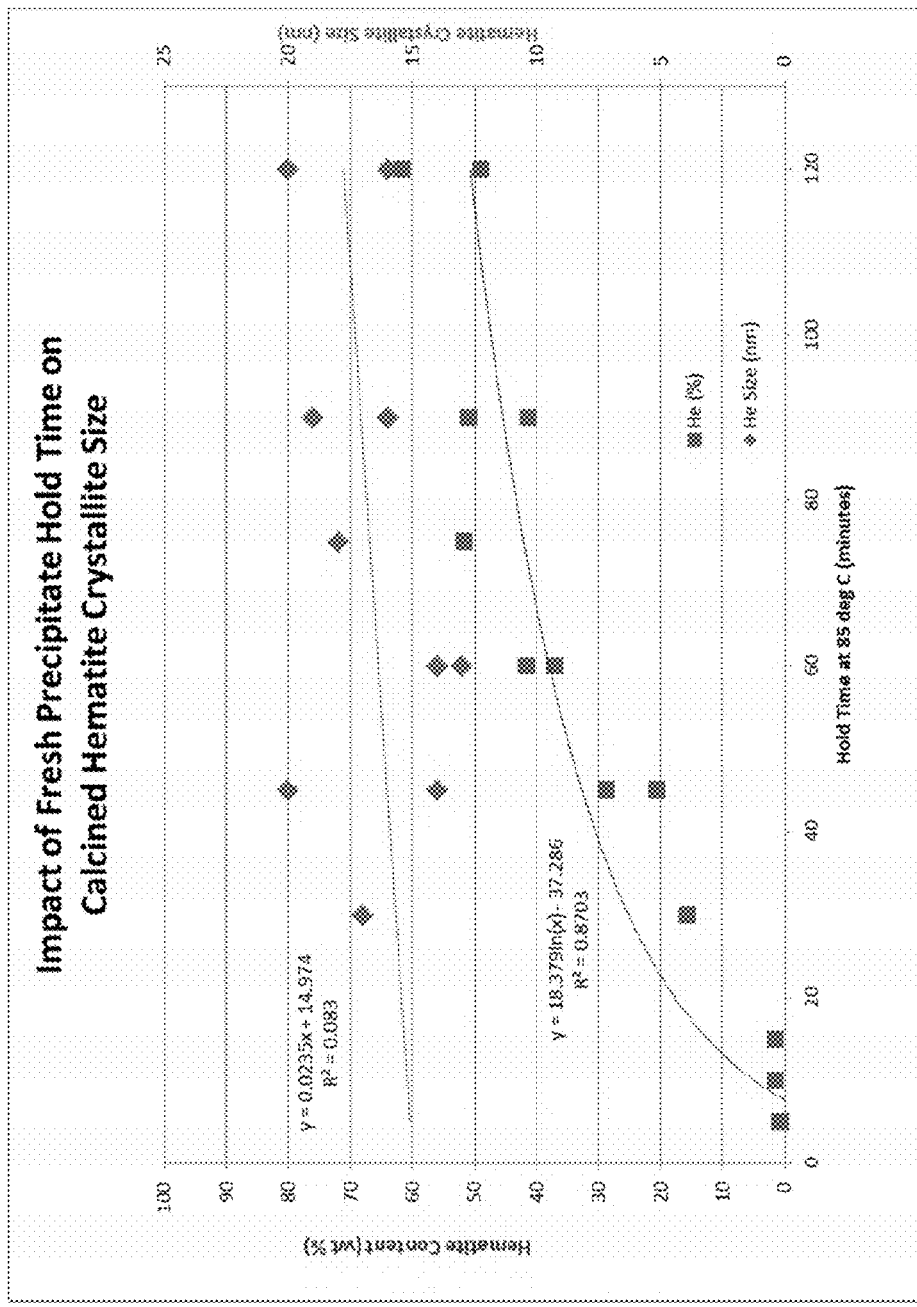
FIG. 3 is a plot of hematite content (weight percent) and hematite crystallite size (nm) as a function of hold time for the catalysts of Example 1.

FIG. 3 is a plot of hematite content (weight percent) and hematite crystallite size (nm) as a function of hold time for the catalysts of Example 1. As can be seen from studying FIG. 3, hematite content and crystallite size both increase with hold time.

Figure 4:
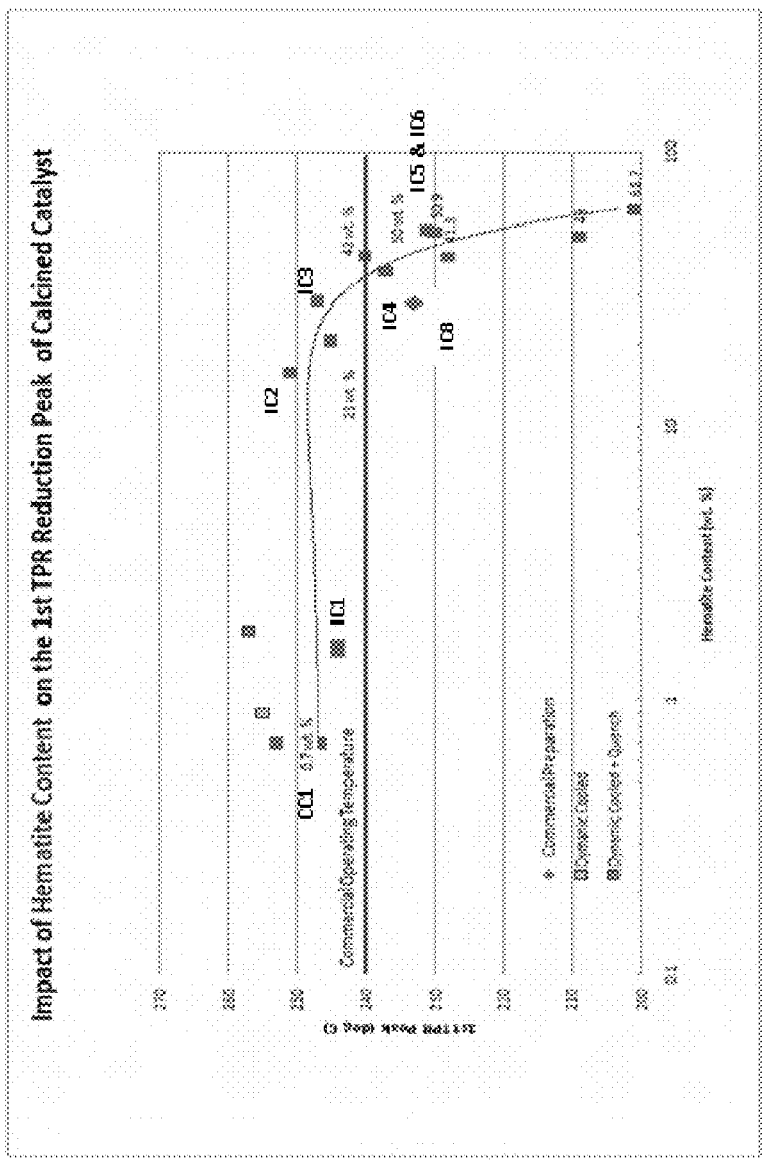
FIG. 4 is a plot of first TPR reduction peak (° C.) as a function of hematite content (weight percent) for the catalysts of Example 1.

FIG. 4 is a plot of first TPR reduction peak (° C.) as a function of hematite content (weight percent) for the catalysts of Example 1. As can be seen from studying FIG. 4, the first TPR reduction temperature decreases with weight percent hematite content.

(kV) 40, Generator current (mA) 40, X-ray tube PW2773 Cu Long Fine Focus, Tube focus Line, Take off angle(°) 6.0000, Divergence slit Fixed slit 1°, Incident beam radius (mm) 173.00 Incident bead soller slit 0.04 rad, Diffracted beam radius (mm) 173.00, Receiving slit height, Fixed slit 0.2 mm, Detector PW3011. For quantification of the hematite, 10 percent cesium is mixed into the catalyst sample.

TABLE 2

Catalysts of Example 1

|  | CC1 | IC1 | IC2 | IC3 | IC4 | IC5 | IC6 | IC7 | IC8 | IC9 | IC10 |
|---|---|---|---|---|---|---|---|---|---|---|---|
| Hold Time, min | 5 | 15 | 30 | 45 | 60 | 75 | 90 | 120 | 60-120 | 15 | 15 |
| Calcined BET Surface Area, m²/g | 289 | 285 | 277 | 270 | 255 | 263 | 254 | 207 | 190-202 | 67 | 122 |
| Pore Volume, cc/g | 0.58 | 0.45 | 0.46 | 0.42 | 0.38 | 0.51 | 0.50 | 0.53 | 0.38-0.44 | 0.26 | 0.26 |
| Pore Width, Å | 80 | 62 | 66 | 62 | 54 | 77 | 76 | 86 | 76-88 | 160 | 84 |
| Hematite, Weight % | 0.7 | 1.6 | 15.7 | 20.6 | 40.6 | 51.8 | 50.9 | 51.7 | 28-35 | 34.7 | 9.9 |
| Average Hematite Crystallite Size, nm | nd$^a$ | nd$^a$ | 17 | 20 | 26 | 18 | 19 | 20 | 20-29 | 12 | nd$^a$ |
| 1$^{st}$ TPR, ° C. | 246 | 244 | 251 | 245 | 237 | 231 | 228 | 201 | 233 | 320 | 350 |
| Attrition Index of Calcined Catalyst | 0.22 | ~ | 0.22 | 0.23 | 0.28 | 0.24 | 0.21 | 0.12 | 0.05 | ~ | ~ |

Figure 5:
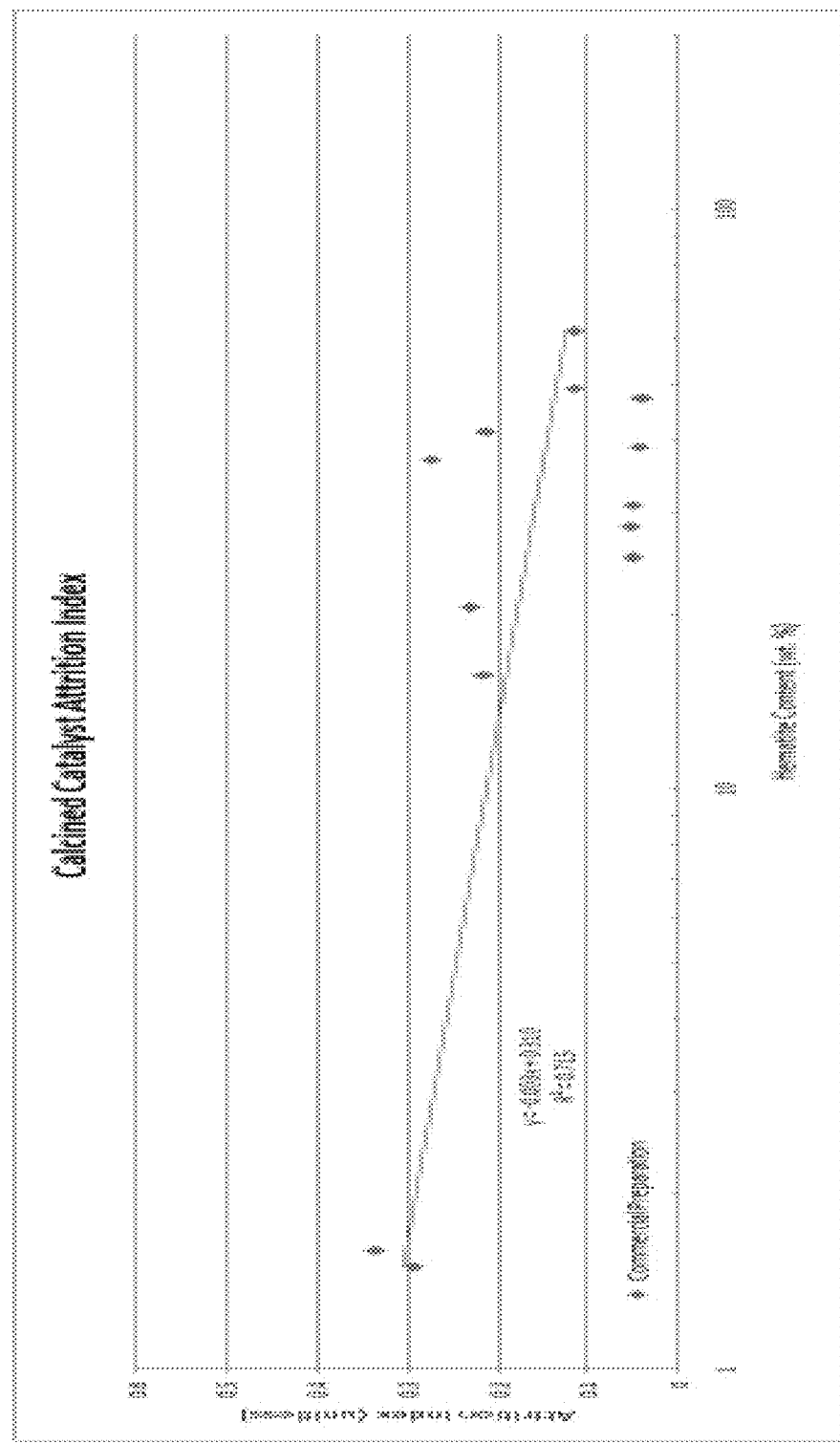
FIG. 5 is a plot of catalyst physical attrition strength as a function of hematite content (weight percent) for the catalysts of Example 1.

CC1 = comparative catalyst/control
IC1 to IC7 = 100 Fe/5 Cu/5.7 K$_2$O/32 SiO$_2$
IC8 = 100 Fe/5 Cu/5.0 K$_2$O/25 SiO$_2$
IC9 = 100 Fe/24 Al$_2$O$_3$
IC10 = 100 Fe/15 Mn/6.0 Cr/20 SiO$_2$/6 Al$_2$O$_3$/3 K$_2$O
$^a$nd: not detectable by analysis FIG. 5 is a plot showing the increase in relative physical strength of the catalyst with increasing hematite content. The catalyst produced in a 2000 lbs catalyst scale up effort at 250 lbs per batch depicted better attrition resistance than the catalysts prepared in the laboratory. This is supported by the attrition index data in Table 2.

High calcined surface area of about 250 m²/g is maintained with hematite content as high as 26.4-40.6 weight percent.

Very good pore volumes at 0.38 to 0.50 cc/g is maintained with hematite content as high as 26.4-40.6 weight percent.

Very good pore sizes at 54 to 76 Å are maintained with hematite content as high as 26.4-40.6 weight percent.

It is clear from the performance data in Table 3 that, with hematite content above 20 weight percent, the hematite-containing catalysts outperform the control catalyst conversion-wise. Methane and light gas selectivity and C$_5$+ selectivity are slightly better. The hematite-containing systems produce slightly more CO$_2$.

Figure 6:
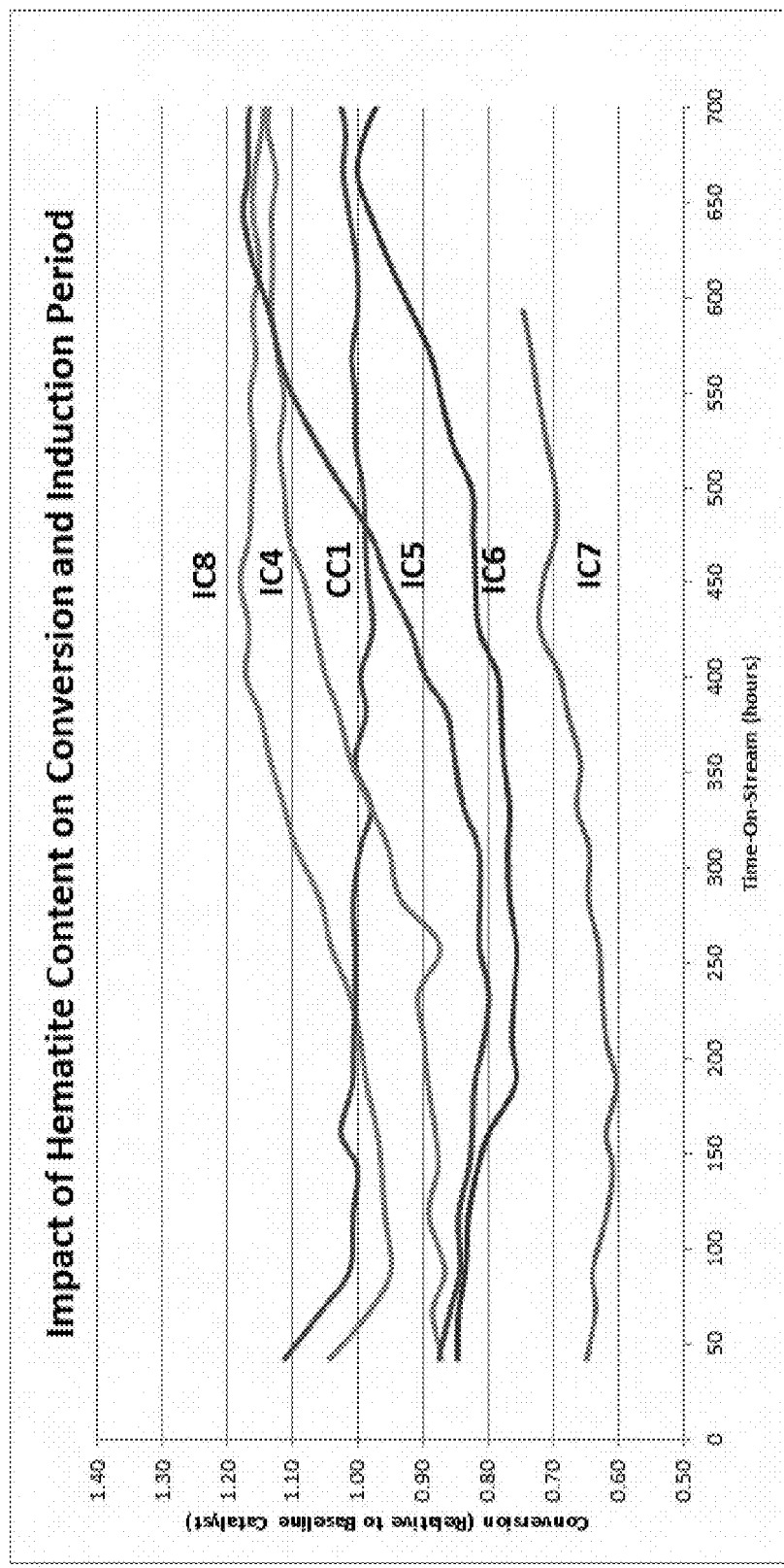
FIG. 6 is a plot of catalyst conversion and induction period as a function of hematite content (weight percent) relative to the baseline catalyst performance for the catalysts of Example 1.
Figure 7:
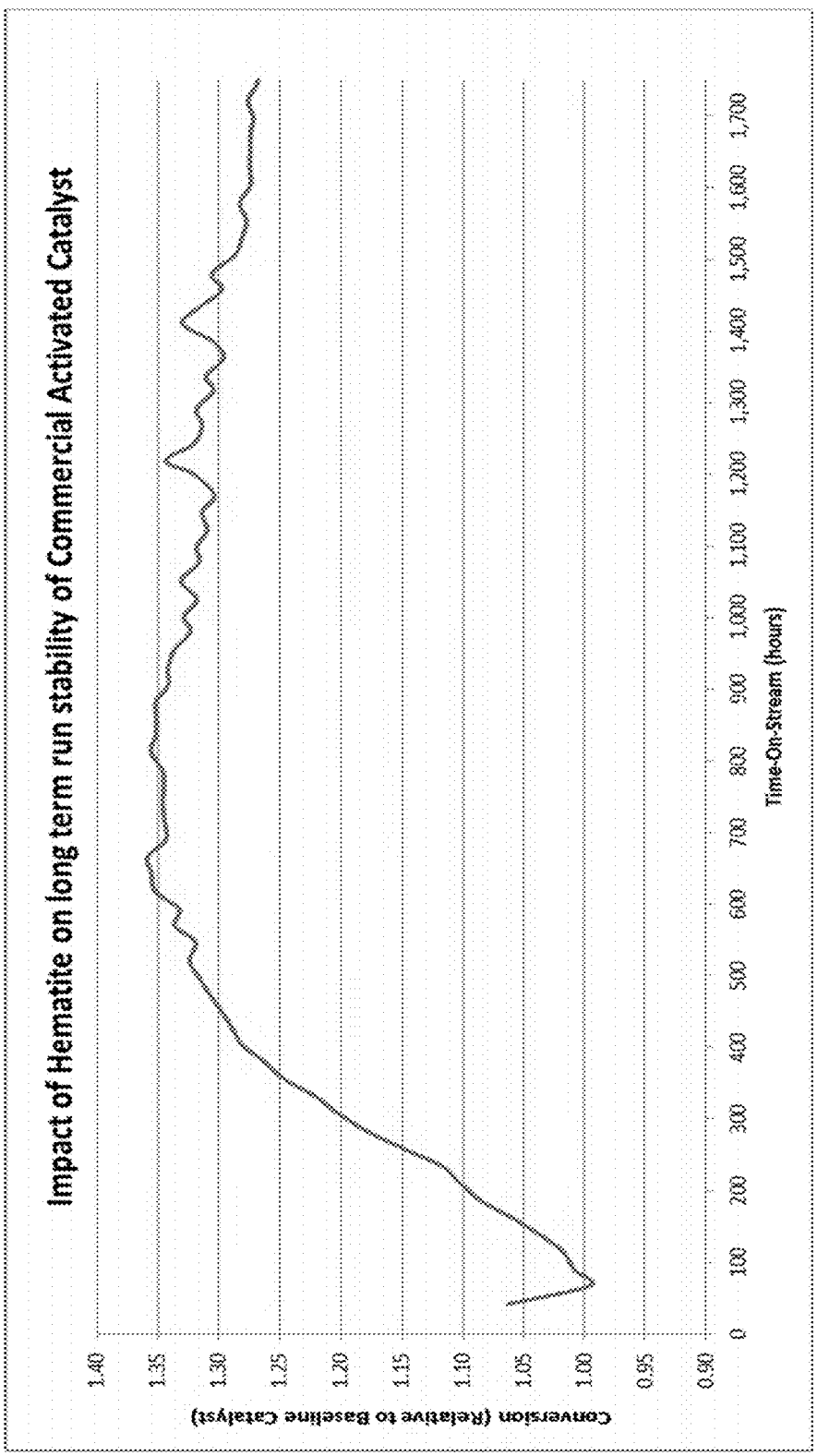
FIG. 7 is a plot of catalyst conversion and run stability as a function of hematite content (weight percent) relative to the baseline catalyst performance for the catalysts of Example 1.

As illustrated in FIG. 6, the relative conversions of IC4, IC5, and IC8 are significantly higher than that for the control system (CC1). When the hematite content is beyond the optimum point (IC6 and IC7), the relative conversion falls below that of the control sample CC1. It is clear from FIG. 7 that a plant activated hematite containing catalyst performs about 1.3 times better than a baseline system, and demonstrates very good long term run stability.

Analytical Methods Used to Determine Catalyst Properties

X-Ray Diffraction Analysis (XRD).

X-ray diffraction analysis was carried out using the following scan parameters: Range (2θ) 7.0100 to 89.9900; Step size (2 θ) 0.0200; Time per step (s) 0.35; Number of data points 4150; Minimum (counts/sec) 0.00; Maximum (counts/sec) 1331; Scan mode Continuous; Diffractometer, Configuration and Settings: Control unit PW3710, Goniometer PW1050, Generator PW1830/00, Generator tension

TABLE 3

Catalyst CSTR Performance at 700 hrs of Example 1 Catalysts Hematite-Containing Catalysts Relative to Control Catalyst

|  | CC1 | IC3 | IC4 | IC5 | IC6 | IC8 |
|---|---|---|---|---|---|---|
| Hold Time, min. | 5 | 45 | 60 | 75 | 90 | 60-120 |
| Hematite Content (wt. %) | 0.7 | 20.6 | 40.6 | 51.8 | 50.9 | 28-35*** |
| CO Conversion (relative) | 1 | 0.67 | 1.13 | 1.16 | 0.95 | 1.14*/1.34** |
| CH$_4$ (relative) | 1 | 1.09 | 0.65 | 0.67 | 0.99 | 0.47*/0.67** |
| C$_1$-C$_4$ (relative) | 1 | 1.12 | 0.71 | 0.71 | 1.03 | 0.51*/0.88** |
| +C$_5$ (relative) | 1 | 0.98 | 0.97 | 0.97 | 1.01 | 0.97*/0.89** |
| CO$_2$ (relative) | 1 | 0.97 | 1.25 | 1.25 | 0.95 | 1.37*/1.34** |

*CSTR activated
**Commercially activated
***2000 lbs of commercially prepared catalyst
CC1 = comparative catalyst (control)
IC1 to IC6 = 100 Fe/5 Cu/5.7 K$_2$O/32 SiO$_2$
IC8 = 100 Fe/5 Cu/5.0 K$_2$O/25 SiO$_2$ BET Surface Area.

Analysis was performed using a Micromeritics TriStar II instrument. Surface areas and pore sizes were determined from multi-point nitrogen volume/partial pressure isotherms using the BET method. Pore diameters were determined using BJH desorption dv method. Samples were degassed under nitrogen for 30 minutes at 50° C., 30 minutes at 75° C. and 180 minutes at 100° C.

Adsorption Points:
P/Po=0.025, 0.05, 0.1, 0.15, 0.2, 0.25, 0.3, 0.35, 0.4, 0.475, 0.55, 0.625, 0.7, 0.775, 0.85, 0.95, 0.995 0.050000, 0.009167 M, 0.013330 M, 0.017500 M, 0.021667 M, 0.025833 M, 0.030000 M, 0.032500, 0.106938, 0.180577, 0.254615, 0.328654, 0.402692, 0.476731, 0.550769, 0.624808, 0.698846, 0.772885, 0.896923, 0.920962.

Desorption Points:
P/Po=0.95, 0.9, 0.85, 0.8, 0.75, 0.65, 0.6, 0.55, 0.5, 0.45, 0.40, 0.35, 0.3, 0.25, 0.20, 0.15, 0.1, 0.05, 0.01 0.995000 V P, 0.995750 P, 0.896500 P, 0.8472550 P, 0.798000 P, 0.748750 P, 0.699500 P, 0.650250 P, 0.601000 P, 0.55175 P, 0.502500 P, 0.453250 P, 0.404000 P, 0.354750 P, 0.305500 P, 0.256250 P, 0.207000 P, 0.157750 P, 0.108500 P, 0.059250 P, 0.010000 P.

Temperature-Programmed Reaction (TPR).

A 22-27 mg sample was weighed out and placed within the sample tube on top of a quartz frit. The tube was connected to the main instrument housing of a Micromeritics ChemiSorb 2750 w/optional ChemiSoft TPx System using knurled nuts and a compression O-ring. The provided programmable instrument furnace, capable of reaching 1100° C., was placed around the sample tube. A thermocouple was installed through the top of the sample port and down into the sample tube using a Teflon ferrule and oriented so the tip was embedded just slightly in the sample mass. The sample was then degassed at 110° C. under a 50 mL/min flow of nitrogen for one hour and then allowed to cool under that same atmosphere prior to testing. Once the sample had cooled, the nitrogen gas was turned off and the testing gas (10% $H_2$ in Argon) was turned on and allowed to flow over the sample for 10 minutes at 50 mL/min prior to testing. A frozen isopropyl alcohol cold trap was prepared and placed around the cold trap on the instrument in order to freeze out water generated during testing prior to the test gas running through the thermal conductivity detector (TCD).

Metals Content (% Cu and % K).

These protocols have been applied to catalyst formulations which are basically 98% iron oxides, 1% copper oxides, and 1% potassium oxide. Other compounds may be present in minimal concentrations as contaminant species.

Digestion Procedure:

a) Weigh catalyst sample (100±10 mg) into a 50 mL beaker with a watch glass cover; b) Add 10 mL of 35% $HNO_3$; c) Bring to a gentle boil for 45 minutes of refluxing. Maintain volume between 5 mL and 10 mL with de-ionized water; d) Cool on lab bench for 1-3 minutes; e) Add 5 mL of concentrated HCl; f) Bring to a gentle boil for 15 minutes of refluxing; g) Cool on lab bench for 1-3 minutes; h) Remove watch glass cover and if necessary, return to hot plate to reduce volume to about 10 mL; and i) Transfer digestate to 100 mL volumetric flask (Class A) and bring to volume with % $HNO_3$. This is called the diluted digestate.

Analysis Procedure:

a) Prepare calibration standards from certified primary standard; b) Dilute 1.000 mL of diluted digestate into a 10 mL volumetric flask (Class A) with desired matrix for element of interest. The dilution matrix used is dependent upon the matrix of the primary standard. This dilution step can be modified to produce samples with concentrations of analyte within the range of the calibration standards. Potassium samples require an ionization suppressant of 0.1-0.2% CsCl or RbCl; c) Analyze calibrations standards and unknowns by atomic absorption spectrophotometry using a suitable apparatus such as a Shimadzu AA-6501 equipped with a graphite furnace and autosampler.

Crystallite Size.

Crystallite Size was calculated using the Full Width Half Maximum (FWHM) of the XRD peaks and the Scherrer Equation (1918). A highly crystalline hematite sample (Aldrich, >98%, approximately 5 μm) was scanned and the FWHM of its peaks were used in the calculations. The crystallite size was calculated for 4 peaks and averaged. The 4 hematite peaks were at 2θ values of 24.1°, 40.8°, 49.4°, and 51.4°.

In Table 4 certain data are listed for Example 1.

TABLE 4

Summary of Parameters for Example 1

| Process step/component | Description |
| --- | --- |
| Iron source | 7% Shepherd Commercial Ferric Nitrate Solution |
| Copper source | 14.9% Shepherd Commercial Copper Nitrate Solution |
| Copper addition method | Copper Nitrate Solution is mixed with Ferric Nitrate Solution |
| Silica addition method | BINDZIL ® 830 |
| Iron Solution Temperature | 70-95° C. |
| Base | $Na_2CO_3$ |
| Base Temp. for Precipitation | 70-95° C. |
| Precipitation Temp. | 70-95° C. |
| Precipitation pH | 7.0-9.0 |
| Total Time for Precipitation | 5-15 min. |
| Potassium source | KOH |
| Mode of potassium addition | slurried before spray drying |
| Drying technique | spray drying |
| Calcination temperature | 300° C./16 h; ramp at 30° C./min |

Attrition Test:

The Air-Jet Attrition test is used as a method to assess relative attrition of 15 grams of Fischer-Tropsch catalysts. It provides an accelerated simulation of attrition that occurs inside a Fischer-Tropsch reactor. The equipment consists of a stainless steel attrition tube, where the catalyst is stressed by high-speed air jets, coming from sub-millimeter nozzles. The airflow is regulated by a mass flow controller, and humidified with a bubbler. Above the attrition tube is a glass settling chamber. An assembly for fines collection is placed above the settling chamber. The percent loss of fines after a specified time of treatment gives a measurement of the attrition resistance for the catalyst. The weight of the fines generated at 6 time intervals over a 5 hour period are documented, and the relative attrition index calculated from the increasing fines trend.

While the preferred embodiments of the invention have been shown and described, modifications thereof can be made by one skilled in the art without departing from the spirit and teachings of the invention. The embodiments described herein are exemplary only, and are not intended to be limiting. Many variations and modifications of the invention disclosed herein are possible and are within the scope of the invention. Accordingly, the scope of protection is not limited by the representative description set out above, but is only limited by the claims which follow, that scope including all equivalents of the subject matter of the claims.

The disclosures of all patents, patent applications, and publications cited herein are hereby incorporated herein by reference in their entirety, to the extent that they provide exemplary, procedural, or other details supplementary to those set forth herein.

What is claimed:

1. A method for producing a supported hematite-containing Fischer-Tropsch catalyst, the method comprising:
    (a) combining an iron nitrate solution with a precipitating agent solution at a precipitating temperature and over a precipitation time to form a precipitate comprising iron phases, wherein the precipitating temperature is less than or equal to 95° C.; wherein the iron nitrate, the precipitating agent solution, or both, comprise a refractory material;
    (b) holding the precipitate from (a) at a hold temperature of greater than or equal to 85° C. for a hold time of greater than or equal to 5 minutes to provide a hematite containing precipitate; and (c) washing the hematite containing precipitate from (b) via contact with a wash solution and filtering, to provide a washed hematite containing Fischer-Tropsch catalyst containing less than 0.3 weight percent sodium.

2. The method of claim 1 further comprising adding a hematite promoter to control the amount of hematite in the hematite-containing Fischer-Tropsch catalyst.

3. The method of claim 2 wherein the hematite-containing Fischer-Tropsch catalyst comprises from 0.5 to 80 weight percent hematite.

4. The method of claim 2 wherein the hematite promoter is selected from the group consisting of basic silica, acidic silica, alumina, titania, manganese, colloidal silica, colloidal alumina, and combinations thereof.

5. The method of claim 4 wherein the hematite-containing Fischer-Tropsch catalyst comprises silica, and wherein 1, 10, 20, 30, 40, 50, 60, 70, 80, 90, or 100% of the silica in the hematite-containing Fischer-Tropsch catalyst co-precipitated during (a).

6. The method of claim 5 wherein the hematite promoter comprises one or more component selected from the group consisting of colloidal acidic silica, basic silica, and potassium water glass.

7. The method of claim 5 wherein the hematite promoter comprises one or more component selected from the group consisting of alumina, titania, manganese, and colloidal alumina.

8. The method of claim 1 wherein the precipitation time is less than or equal to 15 minutes.

9. The method of claim 1 wherein the hold time is greater than or equal to 10 minutes.

10. The method of claim 1 wherein the hold time is greater than or equal to 30 minutes.

11. The method of claim 10 wherein the hold time is greater than or equal to 60 minutes.

12. The method of claim 11 wherein the hold time is greater than 75 minutes.

13. The method of claim 12 wherein the hold time is greater than 90 minutes.

14. The method of claim 1 wherein the hold temperature is greater than or equal to 95° C.

15. The method of claim 1 wherein the iron nitrate solution further comprises copper nitrate, and wherein the precipitate further comprises copper phases co-precipitated with the iron phases.

16. The method of claim 1 wherein the precipitating agent comprises a compound selected from the group consisting of $NH_4OH$, $Na_2CO_3$, NaOH, $K_2CO_3$, KOH, $(NH_4)_2CO_3$, $(NH_4)HCO_3$, $NaHCO_3$ and $KHCO_3$.

17. The method of claim 1 further comprising:
 (d) promoting the washed hematite containing catalyst from (c) with a chemical promoter;
 (e) spray drying the promoted hematite containing catalyst from (d); and
 (f) calcining the spray dried hematite containing catalyst from (e) to provide a calcined hematite-containing Fischer-Tropsch catalyst.

18. The method of claim 17 wherein the washed precipitate comprises less than 0.2, or 0.15 weight percent sodium.

19. The method of claim 17 wherein the washed catalyst comprises a solids content of greater than 15, weight percent.

20. The method of claim 19 wherein the washed catalyst comprises a solids content of greater than 25 weight percent.

21. The method of claim 20 wherein the washed catalyst comprises a solids content in the range of from 25 weight percent to 35 weight percent.

22. The method of claim 17 wherein the calcined catalyst comprises from about 10 weight percent to 70 weight percent hematite.

23. The method of claim 22 wherein the calcined catalyst comprises from 25 weight percent to 70 weight percent hematite.

24. The method of claim 17 wherein the calcined catalyst exhibits an average hematite crystallite size in the range of from 1 nm to 75 nm.

25. The method of claim 24 wherein the calcined catalyst exhibits an average hematite crystallite size of greater than or equal to 15 nm.

26. The method of claim 24 wherein the calcined catalyst exhibits an average hematite crystallite size of greater than or equal to 25 nm.

27. The method of claim 24 wherein the calcined catalyst exhibits an average hematite crystallite size of greater than or equal to 35 nm.

28. The method of claim 24 wherein the calcined catalyst exhibits an average crystallite size in the range of from 1 nm to 50 nm.

29. The method of claim 17 wherein the calcined catalyst exhibits a reduction temperature of less than or equal to 245° C., or in the range of from 200° C. to 245° C.

30. The method of claim 17 wherein the iron nitrate solution further comprises copper nitrate, wherein the precipitate further comprises copper phases co-precipitated with the iron phases, and wherein the calcined catalyst comprises, per 100 Fe, from 1 to 10 parts by weight copper.

31. The method of claim 30 wherein the calcined catalyst comprises, per 100 Fe, from 1 to 5 parts by weight copper.

32. The method of claim 30 wherein the calcined catalyst comprises from 1 to 10 parts by weight chemical promoter.

33. The method of claim 30 wherein the calcined catalyst comprises from 1 to 7 parts by weight chemical promoter.

34. The method of claim 33 wherein the chemical promoter comprises potassium.

35. The method of claim 34 wherein the chemical promoter is selected from the group consisting of $K_2CO_3$, $KHCO_3$, and KOH.

36. The method of claim 35 wherein the calcined catalyst comprises, per 100 Fe, from 1 weight percent to 10 parts by weight $K_2O$.

37. The method of claim 36 further comprising incorporating a silica support into the catalyst.

38. The method of claim 37 wherein the calcined catalyst comprises, per 100 Fe, from 0 to 35 parts by weight silica.

39. The method of claim 37 wherein the calcined catalyst comprises, per 100 Fe, from 0 to 25 parts by weight silica.

40. The method of claim 37 wherein the calcined catalyst comprises, per 100 Fe, from 0 to 15 parts by weight silica.

41. The method of claim 37 wherein the silica comprises a colloidal silica having a pH in the range of from about 8 to 11, a weight percent silica in the range of from 30 to 40, and a surface area in the range of from 250 $m^2$/g to 350 $m^2$/g.

42. The method of claim 41 wherein the colloidal silica has a density of about 1.2 g/$cm^3$, a viscosity of about 7 cP, a $Na_2O$ content less than about 0.6 weight percent, or a combination thereof.

43. The method of claim 17 wherein calcining comprises calcining according to the following program: ramping the temperature at a rate in the range of from about 0.1° C./min to about 80° C./min to a maximum temperature in the range of 300° C. to 550° C., and holding at the maximum temperature for at least 4 hours.

44. The method of claim 17 wherein the calcining comprises a two-step calcination program wherein the catalyst is heated to a selected maximum temperature twice, with gradual cooling of the catalyst between the calcinations.

45. The method of claim 1 wherein the iron nitrate solution comprises at least one solution selected from the group consisting of commercially available ferric nitrate solutions, iron nitrate solutions formed via dissolution of iron powder, and iron nitrate solutions produced via dissolution of scrap metal iron.

* * * * *